United States Patent
Zimmerman

(10) Patent No.: US 12,078,257 B2
(45) Date of Patent: Sep. 3, 2024

(54) VALVE-ACTUATED SUCTION APPARATUS

(71) Applicant: Mighty Ventures, Inc., Rahway, NJ (US)

(72) Inventor: Israel Harry Zimmerman, Los Angeles, CA (US)

(73) Assignee: Harry Zimmerman, Los Angeles, CA (US)

( * ) Notice: Subject to any disclaimer, the term of this patent is extended or adjusted under 35 U.S.C. 154(b) by 0 days.

(21) Appl. No.: 17/937,568

(22) Filed: Oct. 3, 2022

(65) Prior Publication Data

US 2024/0110634 A1  Apr. 4, 2024

(51) Int. Cl.
*F16K 24/04* (2006.01)
*F16B 47/00* (2006.01)
*F16M 13/02* (2006.01)

(52) U.S. Cl.
CPC .............. *F16K 24/04* (2013.01); *F16B 47/00* (2013.01); *F16M 13/022* (2013.01)

(58) Field of Classification Search
CPC ........ F16K 24/04; F16M 13/022; F16B 47/00
USPC ... 248/467, 537, 205.5, 205.8, 206.2, 206.3, 248/309.3, 362, 363
See application file for complete search history.

(56) References Cited

U.S. PATENT DOCUMENTS

| | | | |
|---|---|---|---|
| 355,021 A * | 12/1886 | Lang | F16B 47/00 248/205.8 |
| 1,518,943 A | 12/1924 | Story | |
| 1,753,611 A | 4/1930 | Lower | |
| 1,778,175 A | 10/1930 | Thune | |
| 1,840,400 A | 1/1932 | Lebherz | |
| 2,083,299 A | 6/1937 | Hunter | |
| 2,233,870 A | 3/1941 | Muter | |
| 2,319,726 A | 5/1943 | Duggan | |
| 2,319,727 A | 5/1943 | Duggan | |
| 2,542,400 A | 3/1948 | Donofrio | |
| 2,565,793 A | 8/1951 | Weismantel | |

(Continued)

FOREIGN PATENT DOCUMENTS

| CN | 1079886 A1 | 12/1993 |
|---|---|---|
| CN | 203987324 U | 12/2014 |

(Continued)

OTHER PUBLICATIONS

Zimmerman, "List Of Patent Applications or Patent Applications Treated As Related", Mar. 17, 2023, 2 pages.

*Primary Examiner* — Muhammad Ijaz
(74) *Attorney, Agent, or Firm* — Walter W. Duft

(57) ABSTRACT

A valve-actuated suction apparatus includes an anchor member made of a non-porous resilient material and having a flexible base seal member and an anchor member stem. The base seal member is arranged to seal against a reference surface. The anchor member stem includes a vent port extending therethrough. A plunger valve is operable to selectively seal and unseal the vent port. The plunger valve includes a plunger valve head and a plunger valve stem. The plunger valve stem is slidably disposed in the vent port and slidable between a closed position of the plunger valve wherein the vent port is sealed and an open position of the plunger valve wherein the vent port is unsealed. The plunger valve stem includes one or more protruding transverse flanges that sealably engage a sidewall of the vent port when the plunger valve is in the closed position.

14 Claims, 14 Drawing Sheets

(56) References Cited

U.S. PATENT DOCUMENTS

| | | |
|---|---|---|
| 2,601,279 A | 6/1952 | Hacus |
| 2,740,545 A | 9/1956 | Bates |
| 2,782,948 A | 2/1957 | Steinberg |
| 2,839,260 A | 6/1958 | Jacobi, Jr. |
| 2,895,636 A | 7/1959 | Martin |
| 2,908,473 A | 10/1959 | Snyder |
| 2,910,264 A | 10/1959 | Lindenberger |
| 2,932,119 A | 4/1960 | Borah |
| 2,936,139 A | 5/1960 | Lindstrom |
| 2,963,256 A | 12/1960 | Borah |
| 2,968,888 A | 1/1961 | Borah |
| 3,094,235 A | 6/1963 | Lunning |
| 3,159,370 A | 12/1964 | Rubinstein |
| 3,383,001 A | 5/1968 | Wei |
| 3,675,886 A | 7/1972 | Kampmier |
| 3,847,324 A | 11/1974 | Uchanski et al. |
| 4,040,549 A | 8/1977 | Sadler |
| 4,127,211 A | 11/1978 | Zerbey |
| 4,133,575 A | 1/1979 | Mader |
| 4,137,356 A | 1/1979 | Shoemaker et al. |
| 4,593,947 A | 6/1986 | Yokum |
| 4,726,553 A | 2/1988 | Wischusen, III |
| 4,756,497 A | 7/1988 | Lan |
| 4,759,525 A | 7/1988 | Cross et al. |
| 4,760,987 A | 8/1988 | Lan |
| 4,836,488 A | 6/1989 | Ross |
| 4,872,721 A | 10/1989 | Sniadach |
| 4,890,760 A | 1/1990 | Nicoll, Sr. et al. |
| 4,928,848 A | 5/1990 | Ballway |
| 4,940,138 A | 7/1990 | Hornstein |
| 4,941,635 A | 7/1990 | Lan |
| 4,955,493 A | 9/1990 | Touzani |
| 4,978,566 A | 12/1990 | Scheurer et al. |
| 5,040,719 A | 8/1991 | Ballway |
| 5,065,973 A | 11/1991 | Wang |
| 5,071,096 A | 12/1991 | Hartman et al. |
| 5,076,527 A | 12/1991 | Yung-Huei |
| 5,133,524 A | 7/1992 | Liu |
| 5,180,132 A | 1/1993 | Pearson et al. |
| 5,186,350 A | 2/1993 | McBride |
| 5,190,332 A | 3/1993 | Nagai |
| 5,192,043 A | 3/1993 | Fa |
| 5,207,076 A | 5/1993 | Sciarrillo |
| 5,213,385 A | 5/1993 | Nagai |
| 5,263,760 A * | 11/1993 | Sohol ................ B60J 3/02 248/467 |
| 5,273,182 A | 12/1993 | Laybourne |
| 5,282,541 A | 2/1994 | Chen |
| 5,292,140 A | 3/1994 | Laing |
| 5,381,990 A | 1/1995 | Belokin |
| D357,170 S | 4/1995 | Wellsfry |
| 5,413,302 A | 5/1995 | Ferster |
| 5,511,752 A | 4/1996 | Trethewey |
| 5,531,353 A | 7/1996 | Ward et al. |
| 5,651,520 A | 7/1997 | Belokin et al. |
| 5,667,180 A | 9/1997 | Duckworth |
| 5,742,971 A | 4/1998 | Salinger |
| D397,915 S | 9/1998 | McNaughton |
| D400,763 S | 11/1998 | Taylor et al. |
| 5,992,806 A * | 11/1999 | Adams ................ F16B 15/06 248/205.8 |
| 6,000,575 A | 12/1999 | LaCour et al. |
| 6,039,206 A | 3/2000 | DeFrancesco |
| 6,059,138 A | 5/2000 | Labruyere |
| D439,116 S | 3/2001 | White |
| 6,264,054 B1 | 7/2001 | Miyake et al. |
| 6,315,153 B1 | 11/2001 | Osborn |
| 6,318,683 B1 | 11/2001 | Savoy |
| 6,367,652 B1 | 4/2002 | Toida et al. |
| 6,439,418 B1 | 8/2002 | Immerman et al. |
| 6,491,265 B2 | 12/2002 | Tracy |
| 6,497,394 B1 | 12/2002 | Dunchock |
| 6,511,031 B2 | 1/2003 | Lin |
| 6,520,368 B1 | 2/2003 | Chiu |
| 6,543,637 B1 | 4/2003 | Osborn |
| 6,571,976 B1 | 6/2003 | Sonnabend |
| 6,596,374 B1 | 7/2003 | Adjeleian |
| 6,648,285 B1 | 11/2003 | Woollen |
| 6,666,420 B1 | 12/2003 | Carnevali |
| 6,745,987 B2 | 6/2004 | Rousselet et al. |
| 6,749,160 B1 | 6/2004 | Richter |
| 6,776,368 B2 | 8/2004 | Duncan et al. |
| 6,895,642 B2 | 5/2005 | Huang |
| 7,090,183 B2 | 8/2006 | Heybl et al. |
| 7,178,771 B2 | 2/2007 | Richter |
| 7,201,285 B2 | 4/2007 | Beggins |
| 7,306,113 B2 | 12/2007 | El-Saden et al. |
| 7,344,114 B2 | 3/2008 | Richter |
| 7,458,541 B1 | 12/2008 | Chang |
| 7,481,329 B2 | 1/2009 | Camp, Jr. |
| 7,726,715 B2 | 6/2010 | Nagasawa et al. |
| 8,025,169 B2 | 9/2011 | Zimmerman |
| 8,028,850 B2 | 10/2011 | Zimmerman |
| 8,272,523 B1 | 9/2012 | DeMusis, Sr. |
| 8,534,633 B2 | 9/2013 | Tell |
| 8,560,031 B2 | 10/2013 | Barnett |
| 8,757,418 B2 | 6/2014 | Zimmerman |
| 9,200,667 B1 * | 12/2015 | Hsu ................ F16M 13/02 |
| 9,494,184 B1 | 11/2016 | Lee |
| 9,521,919 B1 | 12/2016 | Reyes |
| 9,651,229 B1 | 5/2017 | Huang |
| 9,801,483 B2 | 10/2017 | D'Alesio |
| 9,803,682 B1 | 10/2017 | Chang |
| 9,814,332 B2 | 11/2017 | Zimmerman |
| 9,936,828 B1 * | 4/2018 | Adams, IV ............ A47G 1/17 |
| 10,520,009 B2 | 12/2019 | Smith et al. |
| 10,753,384 B1 * | 8/2020 | Chang ................ F16K 15/147 |
| 10,774,870 B2 | 9/2020 | Kang |
| 11,255,482 B1 | 2/2022 | Zimmerman |
| 11,415,266 B2 | 8/2022 | Zimmerman |
| 11,525,475 B2 | 12/2022 | Zimmerman |
| 11,552,998 B2 | 1/2023 | Haid et al. |
| 2002/0130133 A1 | 9/2002 | Immerman et al. |
| 2003/0075666 A1 | 4/2003 | Dunchock |
| 2003/0102320 A1 | 6/2003 | Park |
| 2004/0178315 A1 | 9/2004 | Lee |
| 2004/0238541 A1 | 12/2004 | Camp, Jr. |
| 2004/0238542 A1 | 12/2004 | Camp, Jr. et al. |
| 2005/0075666 A1 | 4/2005 | Maas et al. |
| 2006/0175506 A1 | 8/2006 | Lan |
| 2007/0012706 A1 | 1/2007 | Deadman |
| 2007/0205205 A1 | 9/2007 | Kliewer |
| 2008/0093370 A1 | 4/2008 | Darsey |
| 2008/0190948 A1 | 8/2008 | Sayasithsena |
| 2009/0250467 A1 | 10/2009 | Schmidt |
| 2009/0256043 A1 | 10/2009 | Lan |
| 2010/0155550 A1 | 6/2010 | Weiss-Vons |
| 2012/0287560 A1 | 11/2012 | Fan |
| 2012/0329534 A1 | 12/2012 | Barnett et al. |
| 2014/0171157 A1 | 6/2014 | Ho |
| 2014/0326630 A1 | 11/2014 | Henry |
| 2015/0230638 A1 | 8/2015 | Jagger |
| 2015/0240862 A1 * | 8/2015 | Shi ................ F16M 13/022 248/205.8 |
| 2015/0330438 A1 * | 11/2015 | Shi ................ F16B 47/006 248/205.8 |
| 2016/0258471 A1 | 9/2016 | Orban |
| 2018/0149302 A1 | 5/2018 | Papapanos |
| 2019/0022874 A1 | 1/2019 | Mutch et al. |
| 2019/0024699 A1 | 4/2019 | Mutch et al. |
| 2019/0203759 A1 | 7/2019 | Zimmerman |
| 2019/0249709 A1 * | 8/2019 | Smith ................ F16M 13/005 |
| 2020/0232501 A1 | 7/2020 | McClean et al. |
| 2020/0400267 A1 | 12/2020 | Garza |
| 2021/0207647 A1 | 7/2021 | Liao |
| 2021/0341011 A1 * | 11/2021 | Brenner ................ F16B 47/00 |

FOREIGN PATENT DOCUMENTS

| | | |
|---|---|---|
| CN | 204015832 U | 12/2014 |
| CN | 204105618 U | 1/2015 |
| CN | 104545306 A | 4/2015 |
| CN | 204291083 U | 4/2015 |
| CN | 204500194 U | 4/2015 |

(56) References Cited

FOREIGN PATENT DOCUMENTS

| | | | |
|---|---|---|---|
| CN | 105996687 | A | 10/2016 |
| CN | 106438659 | A | 2/2017 |
| CN | 206060860 | U | 3/2017 |
| CN | 207334187 | U | 5/2018 |
| DE | 3742636 | | 1/1989 |
| EP | 1649788 | | 4/2006 |
| GB | 1534235 | A | 11/1978 |
| JP | S4929371 | U | 3/1974 |
| JP | H05187430 | A | 7/1993 |
| JP | H0685924 | U | 12/1994 |
| JP | 2000104724 | A | 4/2000 |
| JP | 2003501315 | | 1/2003 |
| JP | UP2004160079 | | 10/2004 |
| JP | 2006314739 | | 11/2006 |
| JP | 2014173709 | A | 9/2014 |
| KR | 20210104241 | A | 8/2021 |
| WO | WO2012008942 | | 1/2012 |
| WO | WO2019097212 | A1 | 5/2019 |

\* cited by examiner

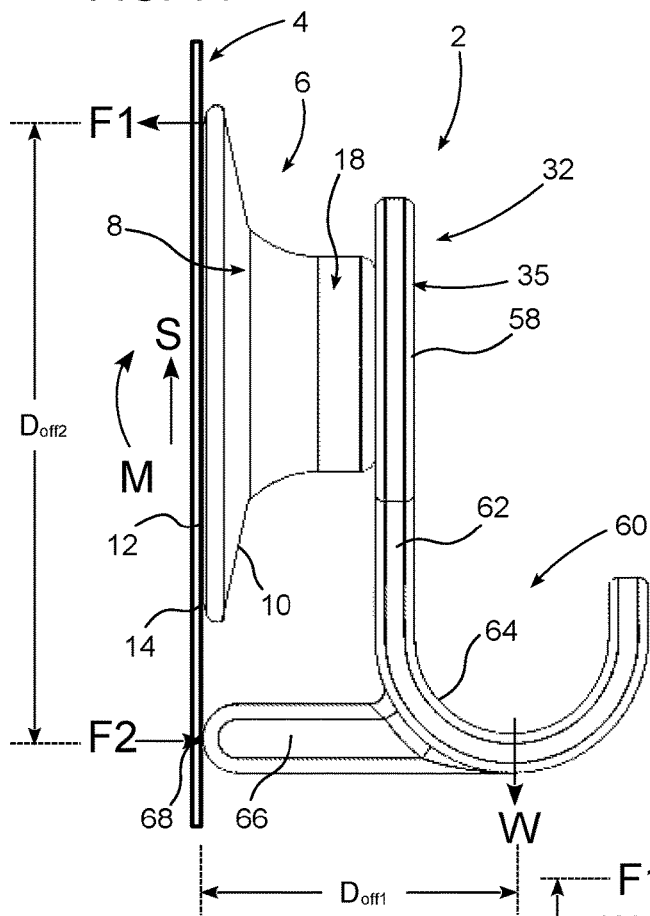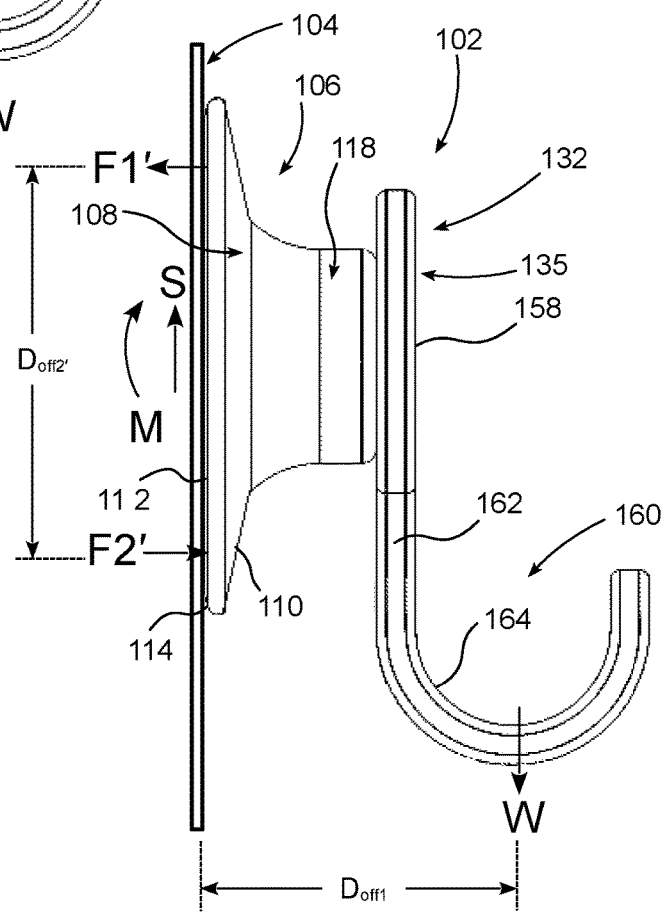

VALVE-ACTUATED SUCTION APPARATUS

BACKGROUND

1. Field

The present disclosure relates to suction apparatus that can be releasably secured to surfaces. More particularly, the disclosure concerns suction apparatus with anchor members that adhere to surfaces by way of differential pressure when flexed. Still more particularly, the disclosure pertains to suction apparatus with quick-release differential pressure venting.

2. Description of the Prior Art

By way of background, suction apparatus that operate by way of differential pressure are known. Such apparatus often utilize resilient anchor members such as suction cups and suction seal stabilizers. A suction cup typically includes a flexible base seal member configured as an elastomeric dome-shaped structure having a concave lower side and a relatively soft peripheral rim. In order to adhere the suction cup to a reference surface, the base seal member must be affirmatively flexed by pressing it against the reference surface with enough force to temporarily flatten the concave lower side so that air is expelled outside the peripheral rim. When the pressing force is released, the base seal member has a natural tendency to return to its initial dome shape. As this rebounding occurs, the volumetric cavity that lies inside the peripheral rim between the base seal member's lower side and the reference surface begins to enlarge. This in turn causes the air pressure in the volumetric cavity to proportionally decrease in accordance with Boyle's Law. A pressure differential is generated in which the pressure within the volumetric cavity is lower than the ambient air pressure outside the cavity, thereby resulting in a partial vacuum. The partial vacuum produces a suction force that increases until an equilibrium condition is reached wherein the elastic forces tending to return the base seal member to its initial concave configuration are balanced by the vacuum forces. Attempts to pull the suction cup away from the reference surface will only increase the size of the volumetric cavity and further decrease the air pressure therein. The resultant suction force will continue to increase until the pulling force becomes large enough to break the seal between the base seal member's peripheral rim and the reference surface.

A suction seal stabilizer includes a base seal member that operates somewhat similarly to a suction cup's base seal member, but is typically less concave, or even flat, and usually made from a softer more resilient material. Alternatively, the base seal member of a suction seal stabilizer may be constructed with the same shape and material as a suction cup base seal member, but may be thinner and more flexible than its suction cup counterpart. When a properly designed suction seal stabilizer is placed on a reference surface, no pushing force needs to be applied to flatten the base seal member apart from the weight of the stabilizer itself and any items or materials that it carries. Such devices are thus generally self-sealing (self-anchoring) in a manner that is not noticeable to the user. Because the base seal member is usually highly flexible and may have little or no concavity, its elastic rebound forces may be relatively weak and generally insufficient to overcome the opposing gravitational forces bearing down on the suction seal stabilizer. If the base seal member remains substantially flat against the reference surface with little or no rebound occurring, the suction forces will be negligible or non-existent. In some designs, the suction seal stabilizer may even be capable of being moved laterally over the reference surface with little apparent resistance. On the other hand, large suction forces will be generated when an attempt is made to pull the suction seal stabilizer away from the reference surface, or tilt the stabilizer, such as by applying a side load against a suction apparatus that incorporates the stabilizer. This property of suction seal stabilizers is advantageous for certain applications, such as when the stabilizer is used in a suction apparatus designed to secure an object or material to a substantially horizontal reference surface. In that case, the suction apparatus can be moved laterally if a side load is applied sufficiently close to the reference surface, but will resist tipping when a side load or acceleration force is applied at higher elevations.

Some suction cups and suction seal stabilizers are designed so that they can only be removed from a reference surface by applying sufficient brute lifting force to break the seal formed by the base seal member's peripheral rim, or by peeling up the rim to create a small opening that vents the volumetric cavity. Other suction cups and suction seal stabilizers are designed with a vent port and are used with a mechanical stopper made of rigid material. The stopper is manually actuated into engagement with the vent port when it is desired to maintain suction, and is manually actuated out of engagement with the vent port when it is desired to break the suction. Existing stoppers for suction cups and suction cup stabilizers have associated disadvantages, including but not limited to design complexity, tendency toward inadvertent dislodgement resulting in base seal member detachment, and inability to vent unless completely separated from the vent port.

It is to improvements in the design of suction apparatus having anchor members embodied as suction cups or suction seal stabilizers that the present disclosure is directed.

SUMMARY

A valve-actuated suction apparatus includes an anchor member made of a non-porous resilient material and having a flexible base seal member and an anchor member stem. The base seal member is arranged to seal against a reference surface. The anchor member stem includes a vent port extending therethrough. A plunger valve is operable to selectively seal and unseal the vent port. The plunger valve includes a plunger valve head and a plunger valve stem. The plunger valve stem is slidably disposed in the vent port and slidable between a closed position of the plunger valve wherein the vent port is sealed and an open position of the plunger valve wherein the vent port is unsealed. The plunger valve stem includes one or more protruding transverse flanges that sealably engage a sidewall of the vent port when the plunger valve is in the closed position.

In another aspect, a method of using a valve-actuated suction apparatus, as summarized above, includes (in no particular order) (1) positioning the anchor member so that the seal member is in contact with the reference surface, (2) actuating the plunger valve to assume or maintain the closed position while flattening the seal member (as necessary) against the reference surface to establish a seal therewith, and (3) actuating the plunger valve to the open position while the seal member is attached to the reference surface to detach the seal member from the reference surface.

BRIEF DESCRIPTION OF THE DRAWINGS

The foregoing and other features and advantages will be apparent from the following more particular description of example embodiments, as illustrated in the accompanying Drawings.

FIG. 14 is a side elevation view of the suction apparatus of FIG. 1 engaging a reference surface with a plunger valve thereof in a closed sealing position, and with an anti-rotation stabilizer thereof engaging the reference surface.

FIG. 15 is a side elevation view of a valve-actuated suction apparatus according to an alternative example embodiment that lacks the anti-rotation stabilizer of FIG. 14.

DETAILED DESCRIPTION OF EXAMPLE EMBODIMENTS

Figure 1:
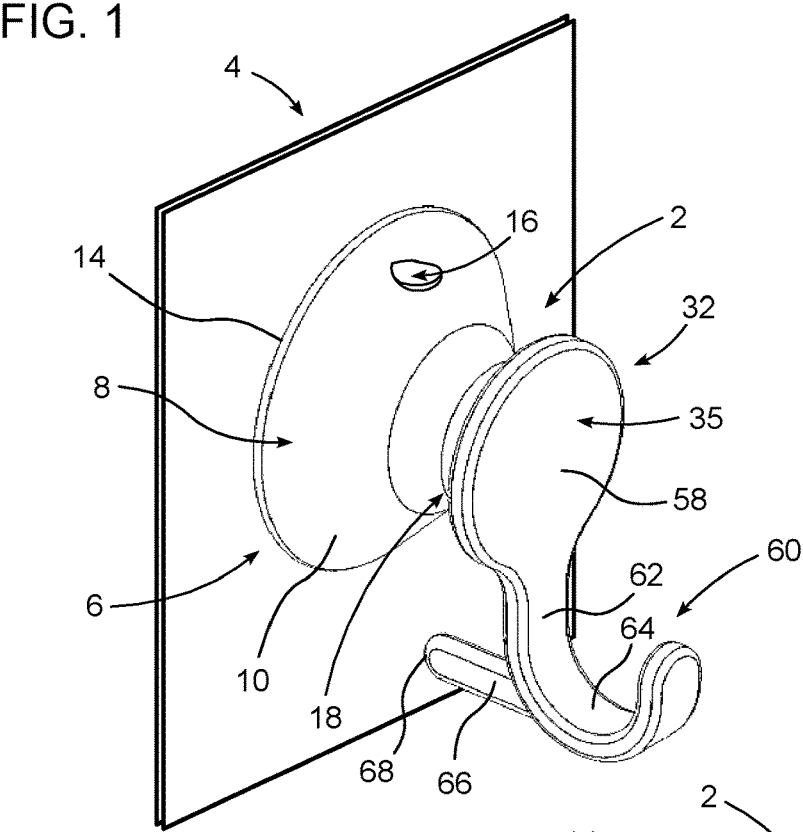
FIG. 1 is a rear perspective view showing a valve-actuated suction apparatus according to an example embodiment, with the suction apparatus attached to a reference surface.
Figure 2:
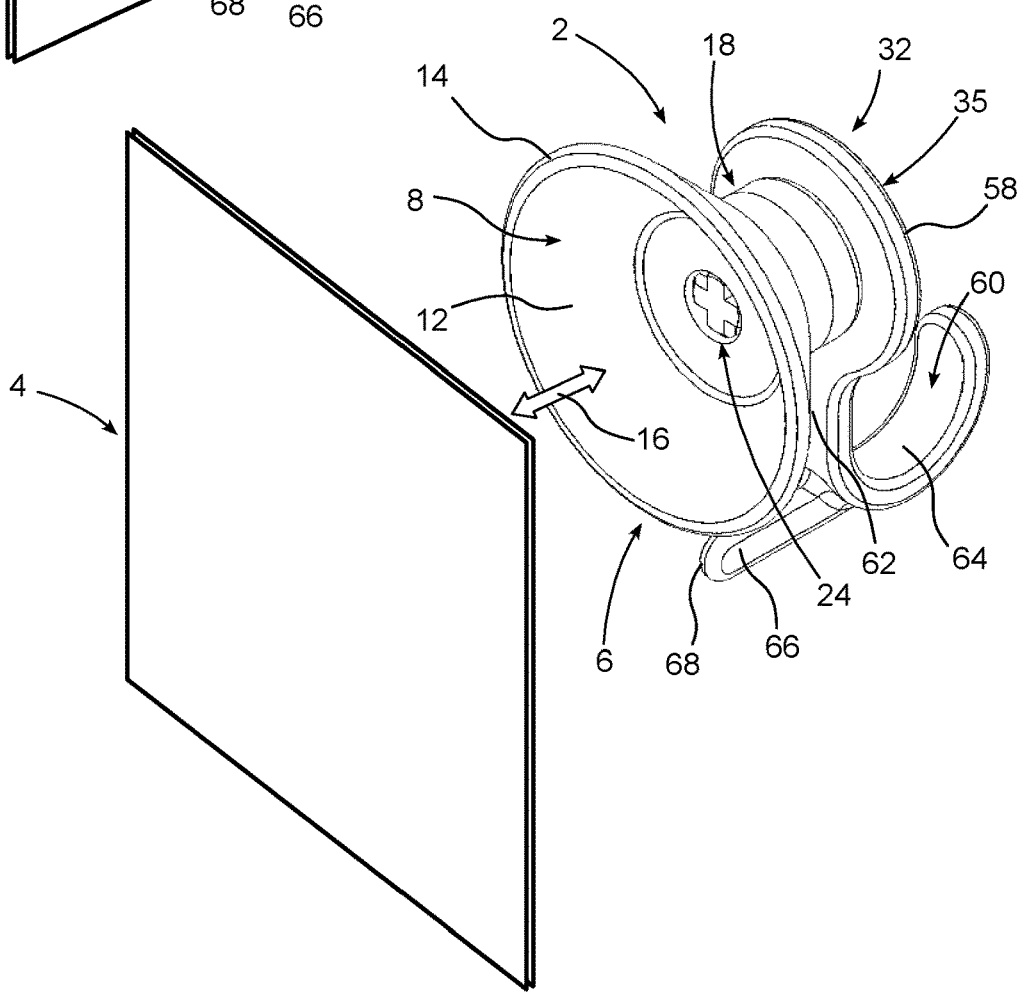
FIG. 2 is a front perspective view showing the suction apparatus of FIG. 1 detached from the reference surface.

Turning now to the drawing figures, in which like reference numbers illustrate like structure in all of the several views, FIGS. 1-2 illustrate one possible embodiment a valve-actuated suction apparatus 2 that may be constructed in accordance with the present disclosure. The suction apparatus 2 may be used for various applications, including to hold or carry one or more items or materials. Advantageously, the suction apparatus 2 provides a quick-release and attachment capability that allows the apparatus to be secured to a reference surface 4 and quickly released therefrom as needed. Although the reference surface 4 is shown as being substantially vertical (such as a wall, door, window, etc.), it could also be substantially horizontal (such as a table or countertop). The reference surface 4 could also have an orientation lying somewhere between vertical and horizontal.

In the illustrated embodiment, the suction apparatus 2 includes an anchor member 6 formed of a non-porous resilient material, such as injection-molded silicone rubber having a suitable hardness and density. Depending on the application for which the suction apparatus 2 will be used, the anchor member 6 may be designed as a suction cup or a suction seal stabilizer. As discussed in the Background section above, suction cups and suction seal stabilizers operate somewhat differently from each other, and have different features and advantages.

Figure 18:
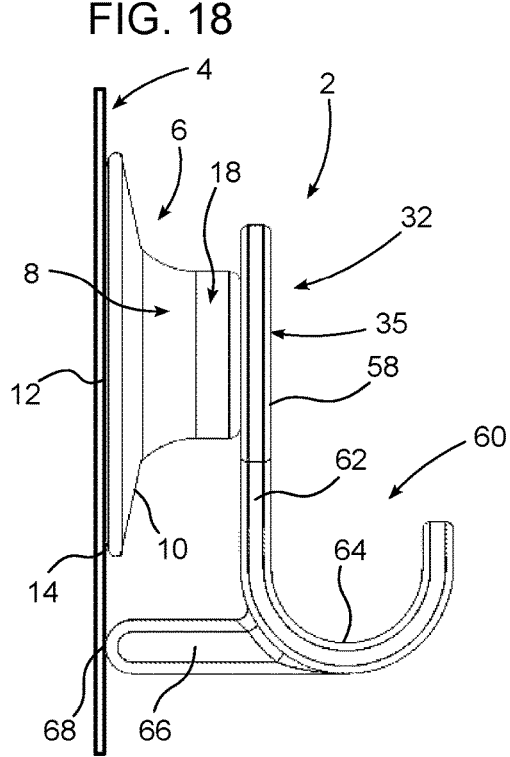
FIG. 18 is a side elevation view of the suction apparatus of FIG. 1 in sealing engagement with a reference surface and with a plunger valve thereof in a closed sealing position.

The anchor member 6 includes a flexible (resiliently deformable) base seal member 8 having a seal member outer side 10 (FIG. 1), a seal member inner side 12 (FIG. 2), and a seal member peripheral edge 14 defining an outer periphery of the base seal member. In some anchor member designs, the base seal member 8 may be inherently formed with a substantially non-flat, dome-like configuration wherein the seal member outer side 10 is convex and the seal member inner side 12 is concave. In such designs, pressing the seal member peripheral edge 14 against the reference surface 4 with sufficient force will resiliently deform the base seal member 8 so as to temporarily bias it into a flattened (partially or wholly) configuration. A flattened configuration of the base seal member 8 is shown in FIG. 1, and is further illustrated in FIG. 18 (described in more detail below). In other anchor member designs, the base seal member 8 may be inherently formed with a substantially flat configuration, and may thus appear as shown in FIGS. 1 and 18 prior to the seal member peripheral edge 14 being pressed against the reference surface, or after being pressed but with very little force being required. Regardless of the anchor member's design, the seal member inner side 12 is designed to seal against the reference surface 4 when engaged thereto with the base seal member 8 being flattened or flat. This sealing engagement defines a controlled pressure zone 16 (FIG. 1) that is capable of maintaining a negative pressure differential relative to the area of ambient pressure outside the controlled pressure zone. The controlled pressure zone 16 represents the region located inside the seal member peripheral edge 14, between the seal member inner side 12 and the reference surface 4 (FIG. 2).

Figure 3:
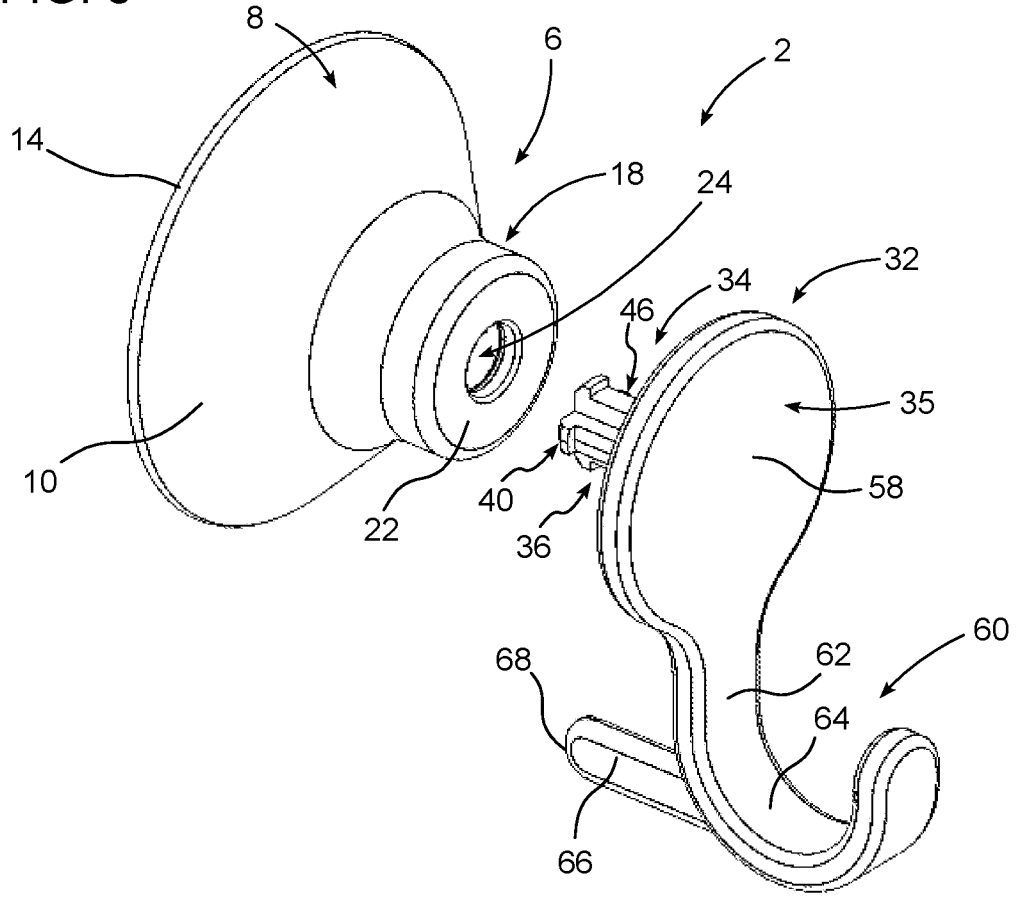
FIG. 3 is an exploded rear perspective view showing the suction apparatus of FIG. 1.
Figure 4:
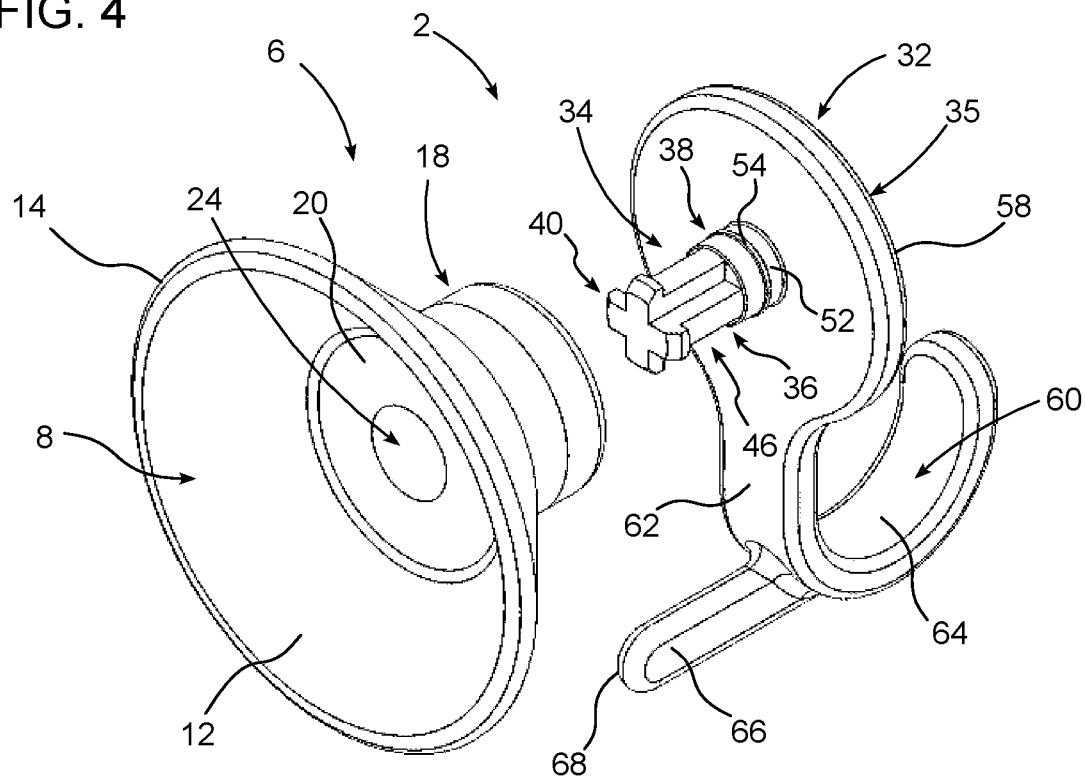
FIG. 4 is an exploded rear perspective view showing the suction apparatus of FIG. 1.

With additional reference now to FIGS. 3-4, the anchor member 6 further includes an anchor member stem 18 having a stem base end 20 (FIG. 4) disposed on the base seal member 8 and a stem free end 22 (FIG. 3) spaced from the stem base end. A vent port 24 extends through the anchor member stem 18. As additionally shown in FIGS. 5-6, the vent port 24 includes a first vent port section 26 and a second vent port section 28. The first vent port section 26 is disposed in relative proximity to the stem base end 20 and the second vent port section 28 is disposed in relative proximity to the stem free end 22. A vent port internal shoulder 30 is defined at an outer end of the first vent port section 26, facing toward the stem base end 20.

Figure 9:
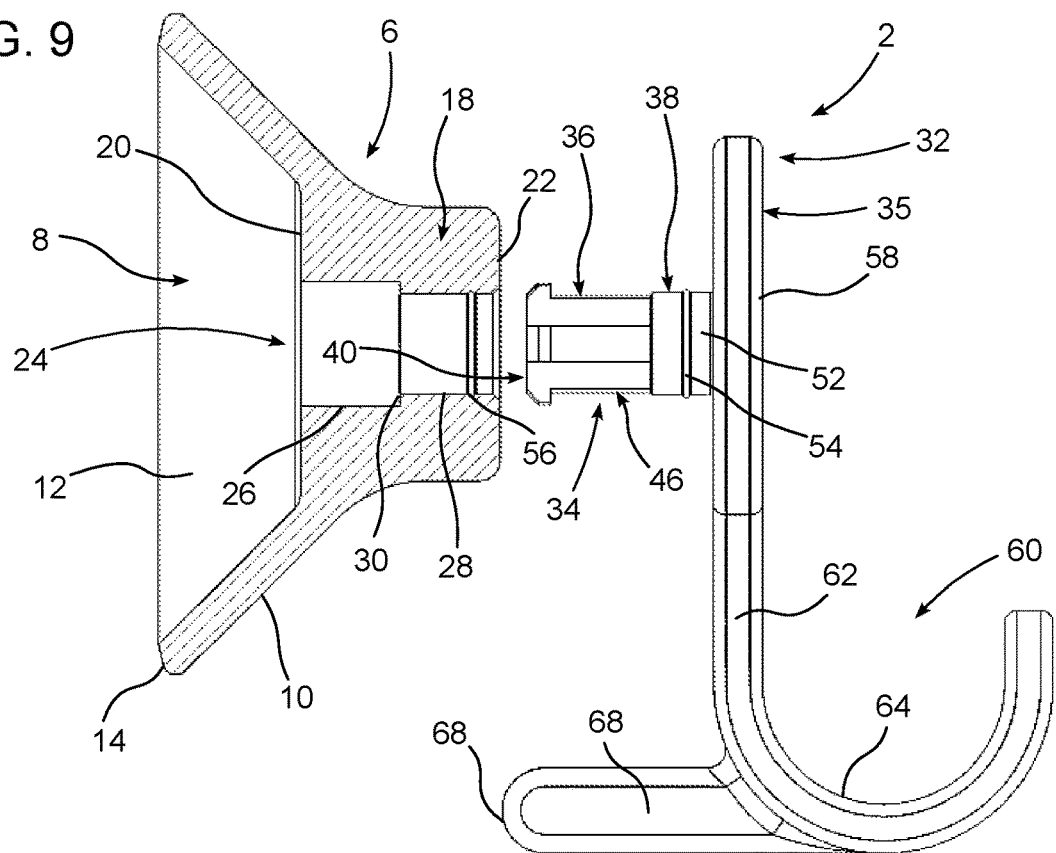
FIG. 9 is a side elevation view of the suction apparatus of FIG. 1, with an anchor member thereof being shown cross-sectionally along its central longitudinal axis, and with a plunger valve thereof being disassembled from the suction cup.
Figure 10:
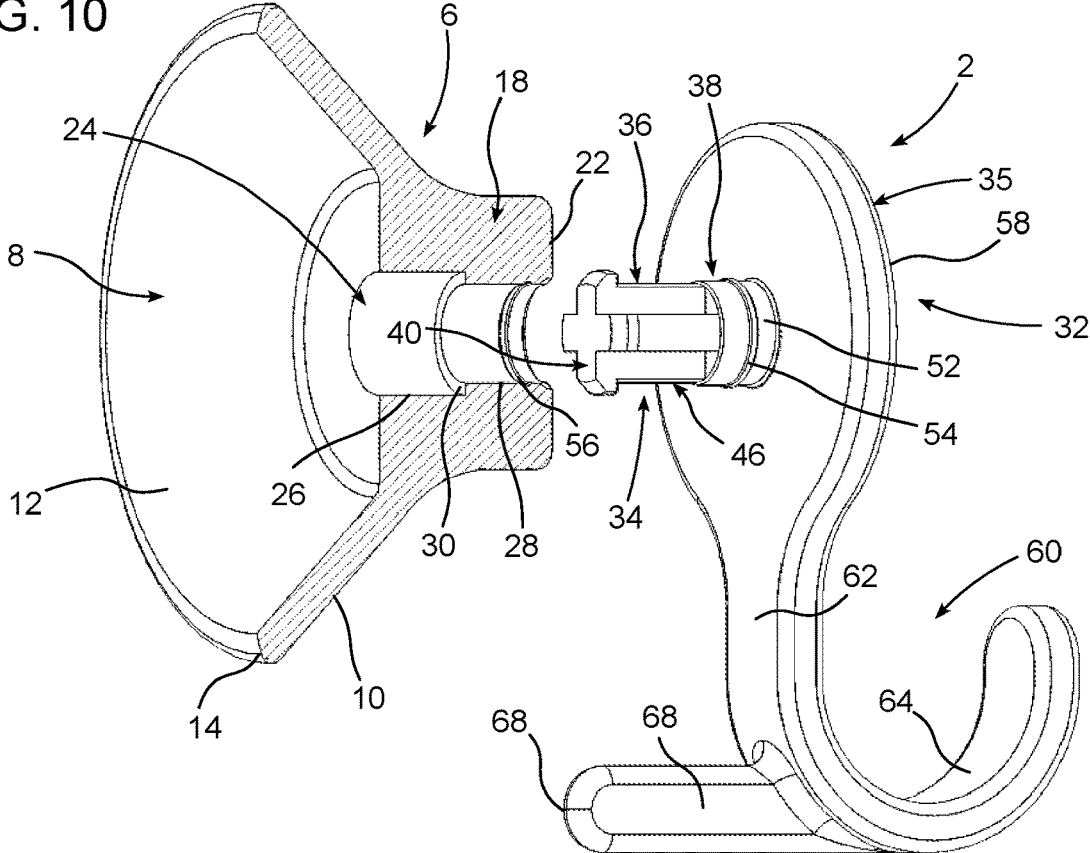
FIG. 10 is a front perspective view of the suction apparatus of FIG. 1, with an anchor member thereof being shown cross-sectionally along its central longitudinal axis, and with a plunger valve thereof being disassembled from the suction cup.

As shown in FIGS. 1-4, the suction apparatus 2 includes a plunger valve 32 that is operable to selectively seal and unseal the vent port 24. The plunger valve 32 may be formed from a material that is more rigid than the anchor member 6, such as injection-molded hard plastic or rubber material. As can be seen in FIGS. 2-3, the plunger valve 32 includes a plunger valve stem 34 and a plunger valve head 35. As additionally shown in FIGS. 5-10, the plunger valve 3 stem 34 is slidably disposed in the vent port 24 for linear (longitudinal) displacement and movement between a closed position of the plunger valve (FIGS. 5-6) wherein the vent port is sealed, and an open position of the plunger valve (FIGS. 7-8) wherein the vent port is unsealed. In order to disassemble the suction apparatus 2 for cleaning or the like, the plunger valve 32 may be displaced beyond the open position to a disassembly position (FIGS. 9-10) wherein the plunger valve is completely separated from the anchor member 6.

In the illustrated embodiment, both the vent port 24 and the plunger valve stem 34 have a circular cross-sectional configuration. This allows the plunger valve stem 34 to rotate within the vent port 24. If it is desired to prevent such rotation, the vent port 24 and the plunger valve stem 34 could each be configured with a non-circular configuration, or a circular configuration with an anti-rotation feature such as a key-and-keyway arrangement.

As can be seen in each of FIGS. 3-10, the plunger valve stem 34 is formed with a first valve stem section 36 and a second valve stem section 38. With additional reference to FIG. 11, the first valve stem section 36 includes a transverse valve stem stabilizer 40 that may be formed at the inner end thereof. The valve stem stabilizer 40 is configured to engage at least two opposing sidewall surfaces of the first vent port section 26 when the plunger valve is in the closed position. This stabilizes the plunger valve stem 34 against unwanted transverse rocking when the plunger valve is in the closed position. For reasons that will become apparent, such rocking could cause inadvertent venting of the controlled pressure zone 16 during use of the suction apparatus 2.

In the illustrated embodiment, the valve stem stabilizer 40 additionally serves as a valve stem slide control guide that limits transverse displacement of the plunger valve stem 34 as the plunger valve 32 displaces longitudinally between its closed and open positions. It does this by continuously slidably engaging the at least two opposing sidewall surfaces of the first vent port section 36 along the entire length of that section. In the illustrated embodiment, all sidewall surface regions of the first vent port section 36 extend axially parallel to each other, but this is not necessarily a design requirement.

Figure 7:
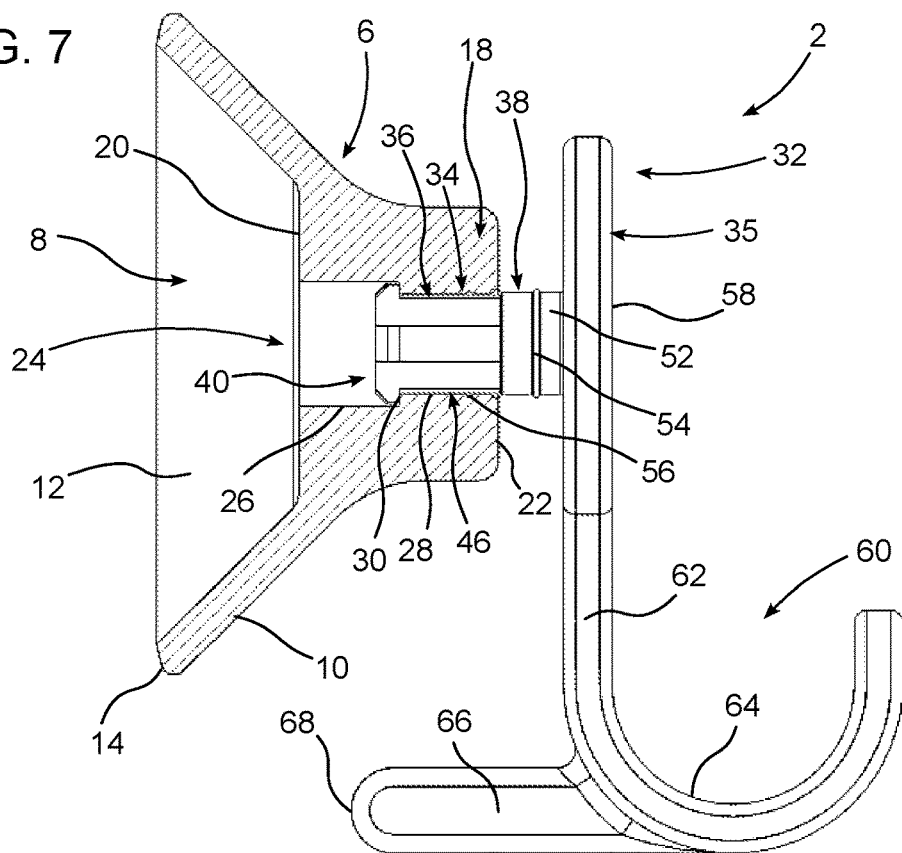
FIG. 7 is a side elevation view of the suction apparatus of FIG. 1, with an anchor member thereof being shown cross-sectionally along its central longitudinal axis, and with a plunger valve thereof being in an open venting position.
Figure 8:
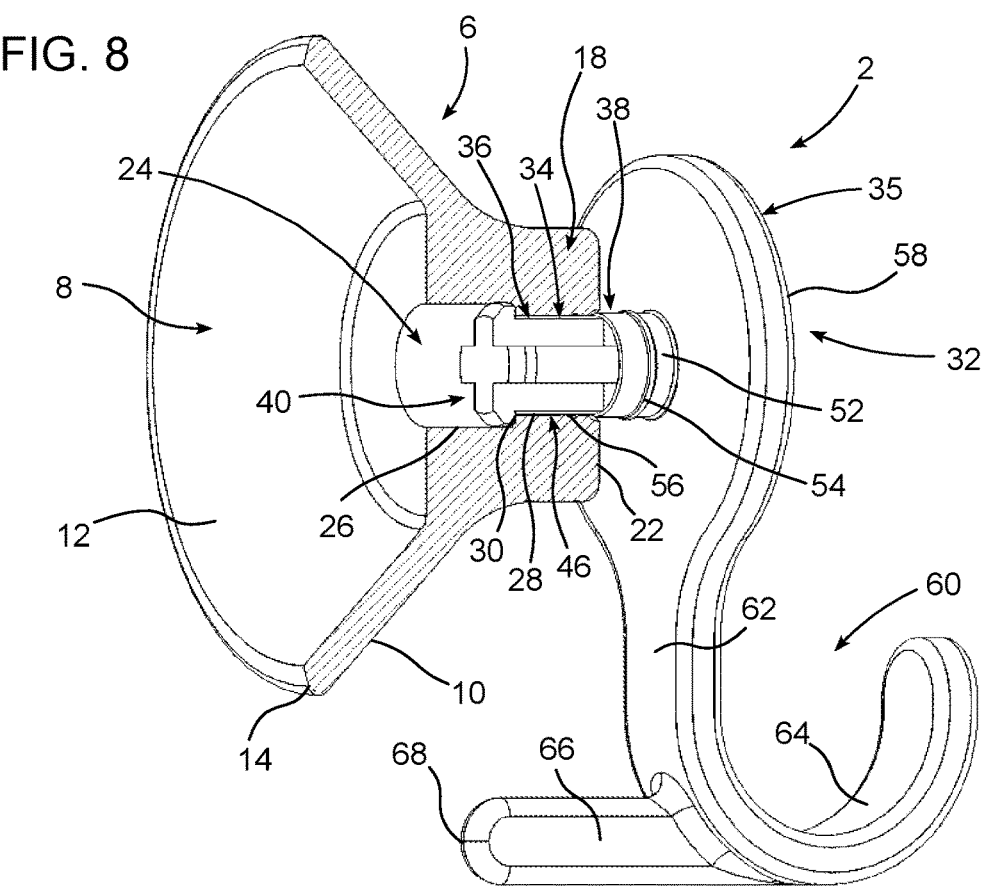
FIG. 8 is a front perspective view of the suction apparatus of FIG. 1, with an anchor member thereof being shown cross-sectionally along its central longitudinal axis, and with a plunger valve thereof being in an open venting position.

As can be seen in FIGS. 7-8, the valve stem stabilizer 40 also blocks against the vent port internal shoulder 30 after the plunger valve 32 slides from the closed position and reaches the open position. The valve stem stabilizer 40 thus serves as a plunger valve axial displacement limiter that prevents removal of the plunger valve 32 from the vent port 24 during normal operation of the suction apparatus 2.

Figure 11:
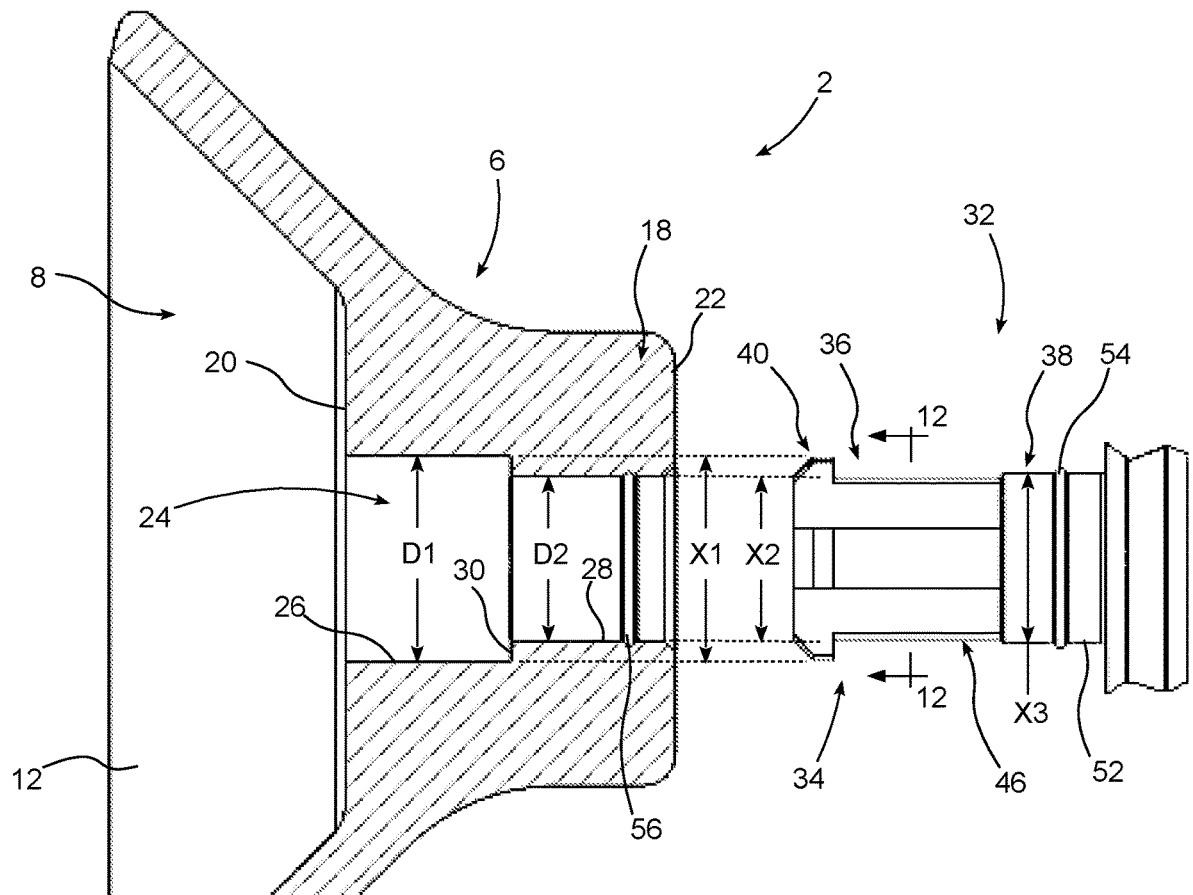
FIG. 11 is a partial cross-sectional and partial side elevation view of the suction apparatus of FIG. 1 in a disassembled state, with an anchor member thereof being shown cross-sectionally along its central longitudinal axis and a portion of a plunger valve thereof being shown in side elevation.
Figure 12:
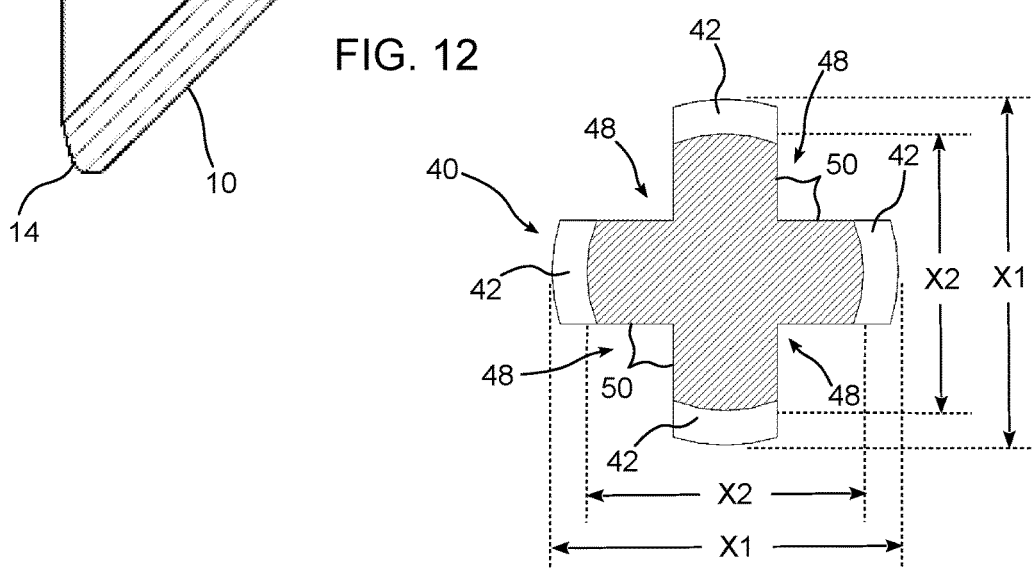
FIG. 12 is a cross-sectional view taken along like 12-12 in FIG. 11.

With additional reference now to FIG. 12, the valve stem stabilizer 40 may include a set of four transversely-protruding valve stem guide prongs 42 that are sized to lightly engage the sidewall of the first vent port section 26. The four transverse guide prongs 42 may be arranged 90 degrees apart so as to thereby prevent valve stem transverse rocking in two dimensions. Additional transverse guide prongs 42 may also be used in order to further stabilize the plunger valve stem 34 against transverse rocking. If the opposing sidewall surfaces engaged by the transverse guide prongs 42 are separated by a transverse dimension "D1" (as shown in FIG. 11), the valve stem stabilizer 40 may have a transverse dimension "X1" across any opposing pair of transverse guide prongs 42 (as shown in FIGS. 11 and 12) that is equal to or slightly less than "D1."

Figure 5:
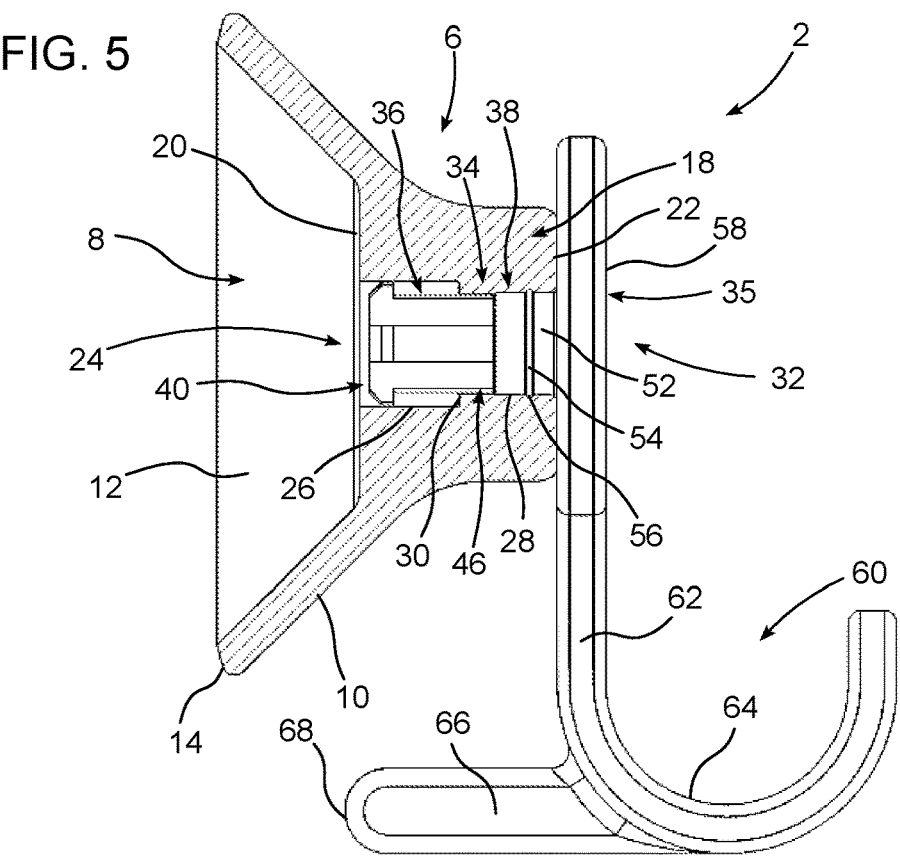
FIG. 5 is a side elevation view of the suction apparatus of FIG. 1, with an anchor member thereof being shown cross-sectionally along its central longitudinal axis, and with a plunger valve thereof being in a closed sealing position.
Figure 6:
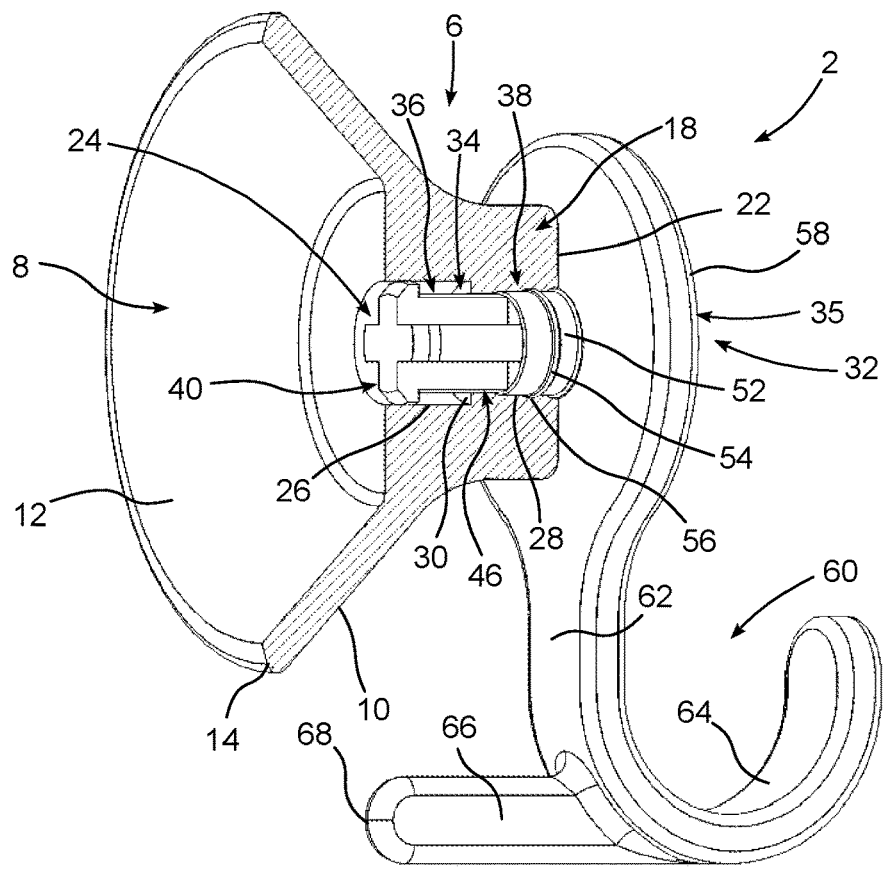
FIG. 6 is a front perspective view of the suction apparatus of FIG. 1, with an anchor member thereof being shown cross-sectionally along its central longitudinal axis thereof, and with a plunger valve thereof being in a closed sealing position.
Figure 13:
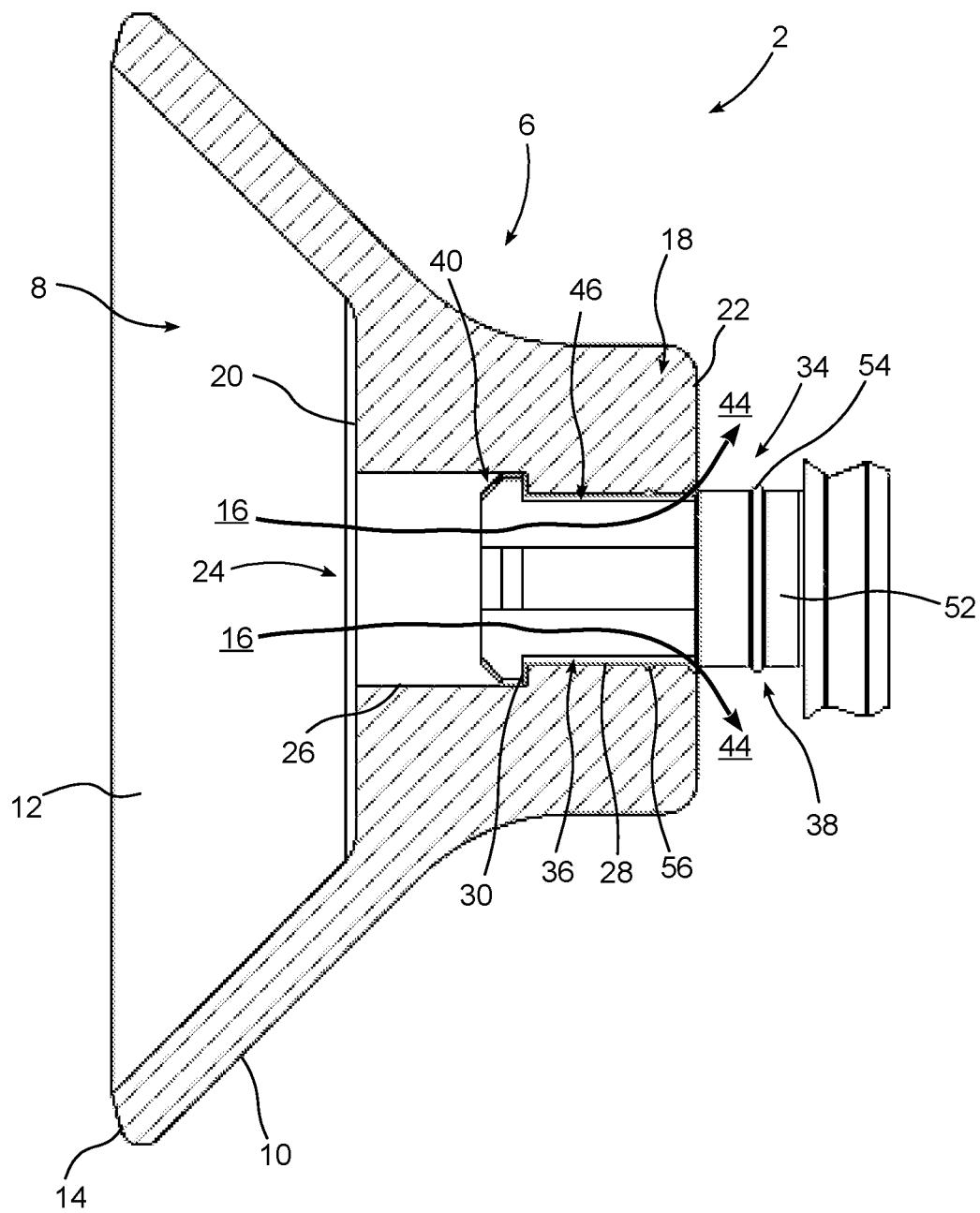
FIG. 13 is a partial cross-sectional and partial side elevation view of the suction apparatus of FIG. 1 in an open position, with an anchor member thereof being shown cross-sectionally along its central longitudinal axis and a portion of a plunger valve thereof being shown in side elevation.
Figure 16:
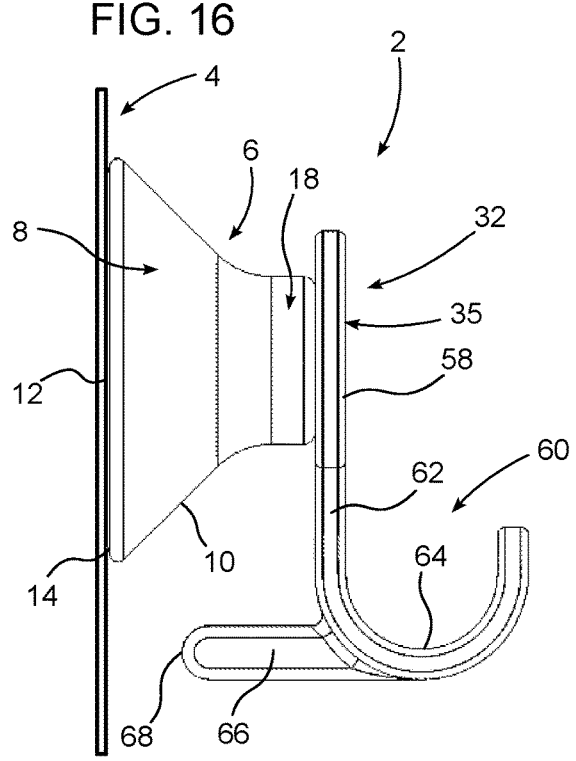
FIG. 16 is a side elevation view of the suction apparatus of FIG. 1 engaging a reference surface with a plunger valve thereof in a closed sealing position.

With continuing reference to FIGS. 3-12, the first valve stem section 36 further includes an air bypass neck 46. As can be seen in FIGS. 5-6, the air bypass neck 46 resides at least partially in the first vent port section 26 when the plunger valve 32 is in the closed position, and may also partially extend into the second vent port section 28. The air bypass neck 46 passes further into the second vent port section 28 as the plunger valve 32 displaces to the open position. As can be seen in FIGS. 7-8, the air bypass neck 44 extends completely through the second vent port section 28 when the plunger valve 32 reaches the open position. In the open position, the air bypass neck 44 is configured to channel air through the second vent port section 28 so as to vent the controlled pressure zone 16 through the vent port 24. FIG. 13 depicts the full venting pathway from the controlled pressure zone 16 on the inner side 12 of the base seal member 8 to an area of ambient pressure 44 outside the suction apparatus 2.

As best shown in FIGS. 11 and 12, the air bypass neck 46 may include one or more axial air flow pathways on the first valve stem section 36. The axial air flow pathways may be implemented as axial channels 48 (e.g., flutes) defined by protruding longitudinal flanges 50 on the first valve stem section 36. By way of example, FIG. 12 depicts four longitudinal flanges 50 on the first valve stem section 36 that define four axial channels 48 to provide the one or more axial air flow pathways of the first valve stem section. As can also be seen in FIGS. 11 and 12, the previously described transverse guide prongs 42 of the valve stem stabilizer 40 may be formed as localized prongs that extend transversely from the longitudinal flanges 50 at the inner end of the first valve stem section 36. If desired, the inner faces of the transverse guide prongs 42 may be tapered to facilitate insertion of the plunger valve stem 34 into the vent port 24.

The longitudinal flanges 50 that define the axial channels 48 of the air bypass neck 46 will typically be spaced from the sidewall surfaces of the first vent port section 26. Although not a requirement, the longitudinal flanges 50 may also be spaced from the sidewall surfaces of the second vent port section 28. As previously described, the first vent port section 26 may have a transverse dimension "D1." As can be seen in FIG. 11, the second vent port section 28 may have a transverse dimension "D2" that is smaller than "D1." The difference between "D1" and "D2" may be used to define the vent port internal shoulder 30 (e.g., as an annular surface). The air bypass neck 46 may have a transverse dimension "X2" across any opposing pair of transverse longitudinal flanges 50. In the illustrated embodiment, the dimension "X2" is less than the transverse dimension "X1" associated with the transverse guide prongs 42 of the valve stem stabilizer 40.

In the illustrated embodiment, the dimension "X2" is less than the transverse dimension "D1" of the first vent port section 26. The dimension "X2" may also be less than the transverse dimension "D2" associated with the second vent port section 28. As described in more detail below, this facilitates removal of the plunger valve stem 34 from the vent port 24 because the longitudinal flanges 50 do not engage the sidewall surfaces of the second vent port section 28, and will therefore not create frictional resistance to plunger valve displacement. In addition, as shown in FIG. 13, sizing the longitudinal flanges 50 so that they are spaced from the sidewall surfaces of the second vent port section 28 provides some measure of venting of the controlled pressure zone 16 when the plunger valve 32 reaches the open position. Thus, in an embodiment, the axial air flow pathways provided by the axial channels 48 of the air bypass neck 46 could be potentially eliminated or reduced in size, particularly if a small gap is provided between the sidewall surfaces of the first vent port section 26 and the valve stem stabilizer 40 (i.e., such that X1<D1) so that air can easily bypass around the entirety of the plunger valve stem 34.

As best shown in FIG. 11, the second valve stem section 38 may be formed as an enlarged vent port stopper 52 configured to plug and seal the second vent port section 28 when the plunger valve 32 is in the closed position in order to prevent the passage of air through the vent port 24. To provide the required sealing, the vent port stopper 52 should have the same cross-sectional shape as the second vent port section 28. In order to further ensure good sealing, the vent port stopper 52 may be cross-sectionally larger than the second vent port section 28 so as to create an interference fit when the vent port stopper engages the second vent port section with the plunger valve 32 in the closed position. To create the interference fit, the vent port stopper 52 may have a transverse dimension "X3" that is slightly larger than the transverse dimension "D2" of the second vent port section 28. In the illustrated embodiment, the vent port stopper 52 and the second vent port section 28 each have a circular cross-section. As such, the dimensions "X3" and "D2" are diameters, and the "X3" diameter of the vent port stopper 52 is larger than the "D2" diameter of the second vent port section 28. For embodiments wherein the cross-sectional shapes of the vent port stopper 52 and the second vent port section 28 are not symmetrical, such that the dimensions "X3" and "D2" are not uniform in all transverse directions, an interference fit may be established by making "X3" larger than "D2" in one or more transverse directions.

One advantage of providing an interference fit between the vent port stopper 52 and the second vent port section 28 is to resist inadvertent opening of the plunger valve 32 and consequent venting of the controlled pressure zone 16. The likelihood of unwanted venting may also be reduced by forming the vent port stopper 52 with sufficient axial length to require a predetermined amount of axial displacement when opening the plunger valve 32 before the vent port stopper clears the second vent port section and vents the controlled pressure zone 16.

In addition to or in lieu of forming the vent port stopper 52 to provide an interference fit with the second vent port section 28, the vent port stopper may be formed with a protruding transverse lock flange 54 that engages a corresponding transverse lock channel 56 in the second vent port section when the plunger valve 32 is in the closed position. The lock flange 54 and the lock channel 56 provide an interlock mechanism that serves to fix the plunger valve 32 in the closed position. Because the vent port stopper 52 and the second vent port section 28 each have a circular cross-section in the illustrated embodiment, the transverse flange 54 may be formed as a circular ring and the transverse channel 56 may be formed as a circular groove.

Summarizing the foregoing discussion of the vent port stopper 52, it will be appreciated that resistance to inadvertent plunger valve opening may be provided by designing the vent port stopper so that it includes either (1) a cross-section that is larger than a cross-section of the second vent port section 28 so as to create an interference fit when the vent port stopper engages the second vent port section with the plunger valve 32 in the closed position, or (2) a protruding transverse lock flange 54 that engages a corresponding transverse lock channel 56 in the second vent port section when the vent port stopper engages the second vent port section with the plunger valve is in the closed position. Alternatively, both of both of features (1) and (2) may be used in the suction apparatus 2.

As shown in FIGS. 1-10, the plunger valve head 35 is disposed outside the vent port 24. It acts as an external valve-actuating member 58 and may be formed as a thumb-engagement pad that enables a user to easily manipulate the plunger valve head 35 in order to pull and push the plunger valve 32 between its closed and open positions. As shown in FIGS. 5 and 6, the plunger valve 32 may be formed so that the valve actuating member 58 engages the free end 22 of the anchor member stem 18 when the plunger valve is pushed into the closed position. The valve actuating member 58 may thus serve as a stop that limits inward displacement of the plunger valve 32 to define the closed position, just as the valve stem stabilizer 40 limits outward displacement of the plunger valve to define the open position. The plunger valve head 35 will also aid in anchoring the suction apparatus 2 by engaging the stem 18 and transferring pushing force onto the anchor member 6 in order to flatten the base seal member 8 against the reference surface 4 should it be necessary to apply such pushing force.

Depending on the application for which the suction apparatus 2 will be used, the plunger valve head 35 and/or some portion of the anchor member 6 (such as the stem 18) may be formed with or mounted to an auxiliary structure designed and operable to carry an object or material that is to be anchored the reference surface 4, or which itself represents the object or material to be anchored, with the auxiliary structure being selected according to whether the reference surface is vertical, horizontal, or somewhere in between.

In the illustrated embodiment of FIGS. 1-10, wherein the reference surface 4 is substantially vertical (or otherwise non-horizontal), the auxiliary structure may include a generally J-shaped carrier hook 60 having a downwardly-depending carrier hook leg section 62 and a generally U-shaped carrier hook trough section 64. The carrier hook leg section 62 may depend downwardly from the valve-actuating member 58 of the plunger valve head 35. As additionally shown in FIG. 14, the carrier hook trough section 64 may be formed at the bottom of the carrier hook leg section 62 and extend outwardly away from the reference surface 4 when the suction apparatus 2 is mounted thereto. The carrier hook trough section 64 could also face toward the reference surface 4 is so desired. During use of the suction apparatus 2, the carrier hook 60 may hold an object or material, such as an article of clothing (not shown) that is to be hung from a door, wall or other substantially vertical structure.

If desired, the back side of the carrier hook 60 (i.e., the side that faces the reference surface 4) may be formed with an optional anti-rotation stabilizer 66 that is sized and configured to engage the reference surface 4 when the suction apparatus 2 is attached thereto with the base seal member 8 in its sealed condition. This is shown in FIGS. 1 and 14. The anti-rotation stabilizer 66 may be configured as a transverse strut that extends from the back (closed) side of the carrier hook trough section 64 toward the reference surface 4 and away from the front (open) side of the trough section that carries an object to be held. In this configuration, the anti-rotation stabilizer 66 extends generally perpendicular to the reference surface 4 at a height which is below the base seal member 8, such that a free end thereof forms a tip 68 that engages the reference surface below the base seal member. It will be appreciated that other embodiments of the anti-rotation stabilizer 66 could have different structural configurations, some of which may fall into the strut category, while others do not.

As shown in FIG. 14, when the suction apparatus 2 is mounted to the reference surface 4 and the carrier hook 60 carries an object, the weight "W" of the object will apply a downward load to the carrier hook trough section 64. This downward load is reacted by the carrier hook leg section 62 and transferred to the plunger valve head 35, and then carried by the plunger valve 32 through the anchor member stem 18 to the base seal member 8, and applied to the reference surface 4 by the seal member inner side 12, usually proximate to the seal member peripheral edge 14. Assuming the reference surface 4 is substantially vertical, the downward object weight "W" is reacted at the reference surface 4 by an equal and opposite shearing force "S" that acts upwardly on the seal member inner side 12.

Because the object weight "W" is applied at an offset distance "$D_{eff1}$" from the reference surface 4, a pivot-inducing moment "M" of magnitude W*$D_{off1}$ will be applied to the suction apparatus 2. The pivot-inducing moment "M" will be reacted at the reference surface 4 by a counteracting moment produced by a pair of equal and opposite coupling forces "F1" and "F2" of magnitude "F," separated by an offset distance "$D_{off2}$." In FIG. 14, the coupling force "F1" represents a tensile force that is distributed in some fashion around the upper portion of the seal member inner side 12, such as near the upper region of the seal member peripheral edge 14. The coupling force "F1" is seen by the base seal member 8 as a pulling force tending to separate the seal member inner side 12 away from the reference surface 4. This force is resisted by the pressure differential inside the controlled pressure zone 16. The coupling force "F2" represents a compressive force that is applied to the tip 68 of the anti-rotation stabilizer 66, which is below the base seal member 8.

In order for the suction apparatus 2 to maintain static balance, the counteracting moment generated by the equal and opposite coupling forces "F1" and "F2" of magnitude "F," acting at the coupling distance "$D_{off2}$," must be equal to the pivot-inducing moment "M" applied by the object weight "W" acting at the offset distance Dom. In other words, (F*$D_{off2}$)=M=(W*$D_{off1}$). The amount of weight "W" that can be carried by the suction apparatus 2 anchor member 6 is therefore dependent on the ability of the anchor member 6 to withstand the coupling forces "F1" and "F2" without the base seal member 8 separating from the reference surface 4.

The benefit of using the anti-rotation stabilizer 66 may be appreciated by considering FIG. 15. FIG. 15 depicts a suction apparatus 102 according to an alternative example embodiment. The suction apparatus 102 is similar in most respects to the suction apparatus 2 (as shown by the used of corresponding reference numbers incremented by 100), the sole difference being that it lacks an anti-rotation stabilizer. In this embodiment, the pivot-inducing moment "M" generated by applying the object weight "W" at the offset distance "Dom" from the reference surface 4 is reacted by a counteracting moment produced by a pair of equal and opposite coupling forces "F1'" and "F2'" of magnitude "F'," separated by an offset distance "$D_{off2'}$" As before, the coupling force "F1'" represents a tensile force that is distributed around the upper portion of the seal member inner side 12, such as near the upper region of the seal member peripheral edge 14. However, in contrast to the embodiment of FIG. 14, the coupling force "F2'" represents a compressive force distributed in some fashion around the lower portion of the seal member inner side 12, such as near the lower region of the seal member peripheral edge 14. Insofar as the coupling forces "F1'" and "F2'" in FIG. 15 are closer together than the coupling forces "F1" and "F2" in FIG. 14 (i.e., $D_{off2'}$<$D_{off2}$), the magnitude of "F'" in FIG. 15 will be proportionally higher than the magnitude of "F" in FIG. 14 in order to produce the same counteracting moment that counteracts the pivot-inducing moment "M" due to the object weight "W." This is given by the relationship (F'*$D_{off2'}$)=M=(F*$D_{off2}$). Solving for "F'," it will be seen that F'=F*($D_{off2}$/$D_{off2'}$). This means that given the same object weight "W," the suction apparatus 102 of FIG. 15 will tend to separate from the reference surface 4 more easily than the suction apparatus 2 of FIG. 14. The anti-rotation stabilizer 66 therefore advantageously increases the load-bearing capacity of the suction apparatus 2. The anti-rotation stabilizer 66 can also reduce downward bending of the anchor member 6 resulting from localized distortions caused by the object weight "W" being carried. This will help maintain the carrier hook 60 in its proper upright orientation.

Figure 17:
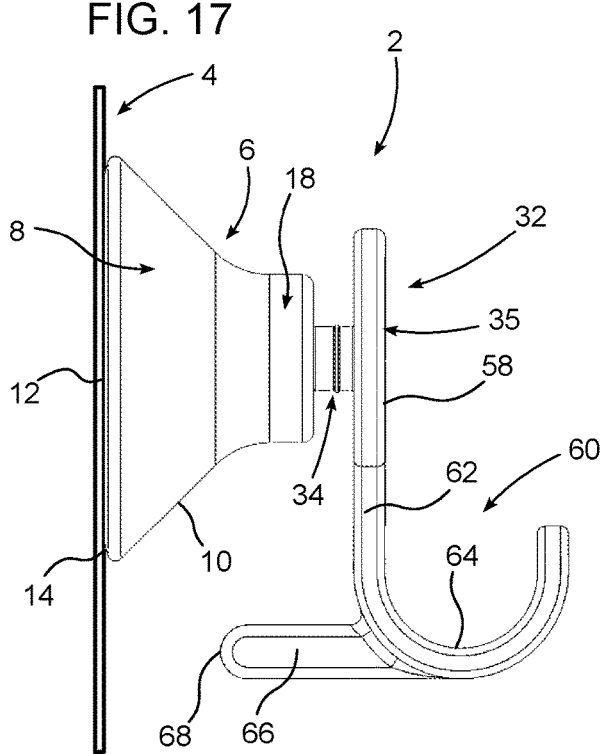
FIG. 17 is a side elevation view of the suction apparatus of FIG. 1 engaging a reference surface with a plunger valve thereof in an open venting position.

With reference now to FIGS. 16-19, a method of using the suction apparatus 2 will be described as a series of operations that need not be performed in any particular order. When it is desired to attach the suction apparatus 2 to the reference surface 4, the suction apparatus may be positioned so that the inner side 12 of the base seal member 8 is in contact with the reference surface. The plunger valve 32 may be in either the closed position (FIG. 16) or the open position (FIG. 17). As shown in FIGS. 5-6, when the plunger valve 32 is in the closed position, the vent port stopper 52 plugs the second vent port section 28 and the valve stem stabilizer 40 maintains contact with opposing sidewall surfaces of the first vent port section 26. As shown in FIGS. 7-8, when the plunger valve 32 is in the open position, the vent port stopper 52 is retracted from the second vent port section 28, the valve stem air bypass neck 46 is disposed in the second vent section to channel air therethrough, and the valve stem stabilizer 40 engages the vent port internal shoulder 30, and may also maintain contact with opposing sidewall surfaces of the first vent port section 26.

When it is desired to seal the suction apparatus 2 to the reference surface 4, the suction apparatus may be manipulated by the user so that the plunger valve 32, and particularly the valve-actuating member 58 of the plunger valve head 35, is pushed toward the reference surface. As shown in FIG. 18, this will cause the plunger valve 32 to assume or maintain the closed position while flattening the base seal member 8 (as necessary according to the base seal member's configuration) against the reference surface 4. This will establish and seal the controlled pressure zone 16, thereby rendering it airtight in order to maintain a negative pressure differential relative to the area of ambient pressure 44 outside the controlled pressure zone. If the carrier hook 60 includes the anti-rotation stabilizer 62, the tip 68 thereof will now engage the reference surface 4 below the base seal member 8, and thus stabilize the suction apparatus 2 against pivoting (clockwise in the environment of FIG. 18) when an object is placed on the carrier hook.

Figure 19:
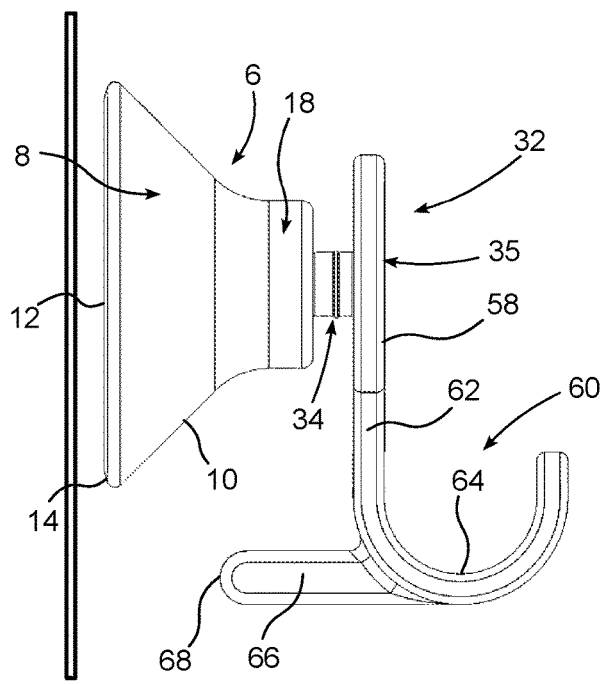
FIG. 19 is a side elevation view of the suction apparatus of FIG. 1 spaced from a reference surface with a plunger valve thereof in an open venting position.

When it is desired to detach the suction apparatus 2 from the reference surface 4, the plunger valve 32 may be actuated to the open position by pulling on the valve-actuating member 58 of the plunger valve head 35. This will vent the controlled pressure zone 16 and release the negative pressure differential relative to the area of ambient pressure 44 outside the controlled pressure zone. As shown in FIG. 19, the suction apparatus 2 may then be easily separated from the reference surface 4.

Turning now to FIGS. 20-24, a modified version of the valve-actuated suction apparatus 2 is shown. In this embodiment, the plunger valve 32 is replaced with an alternative plunger valve 132. The alternative plunger valve 132 is similar in many respects to the original plunger valve 32, and corresponding elements are designated by corresponding reference numbers incremented by "100." The alternative plunger valve 132 differs from the original plunger valve 32 insofar as its plunger valve stem 134 includes first and second transverse flanges that may be formed (e.g., as circular rings) on the vent port stopper 152 portion of the second valve stem section 138.

The first transverse flange is provided as a transverse lock flange 154 that may correspond in structure and function to the previously described lock flange 54 of the original plunger valve 32. The transverse lock flange 154 may thus be arranged to sealably engage and lock into a corresponding transverse lock channel 56 formed in the sidewall of the second vent port section 28 of the suction cup 6. This sealable engagement occurs when the plunger valve 132 is in its closed position, and may be assisted by sizing the transverse lock flange 154 so that it engages the transverse lock channel 56 with an interference fit.

Figure 22:
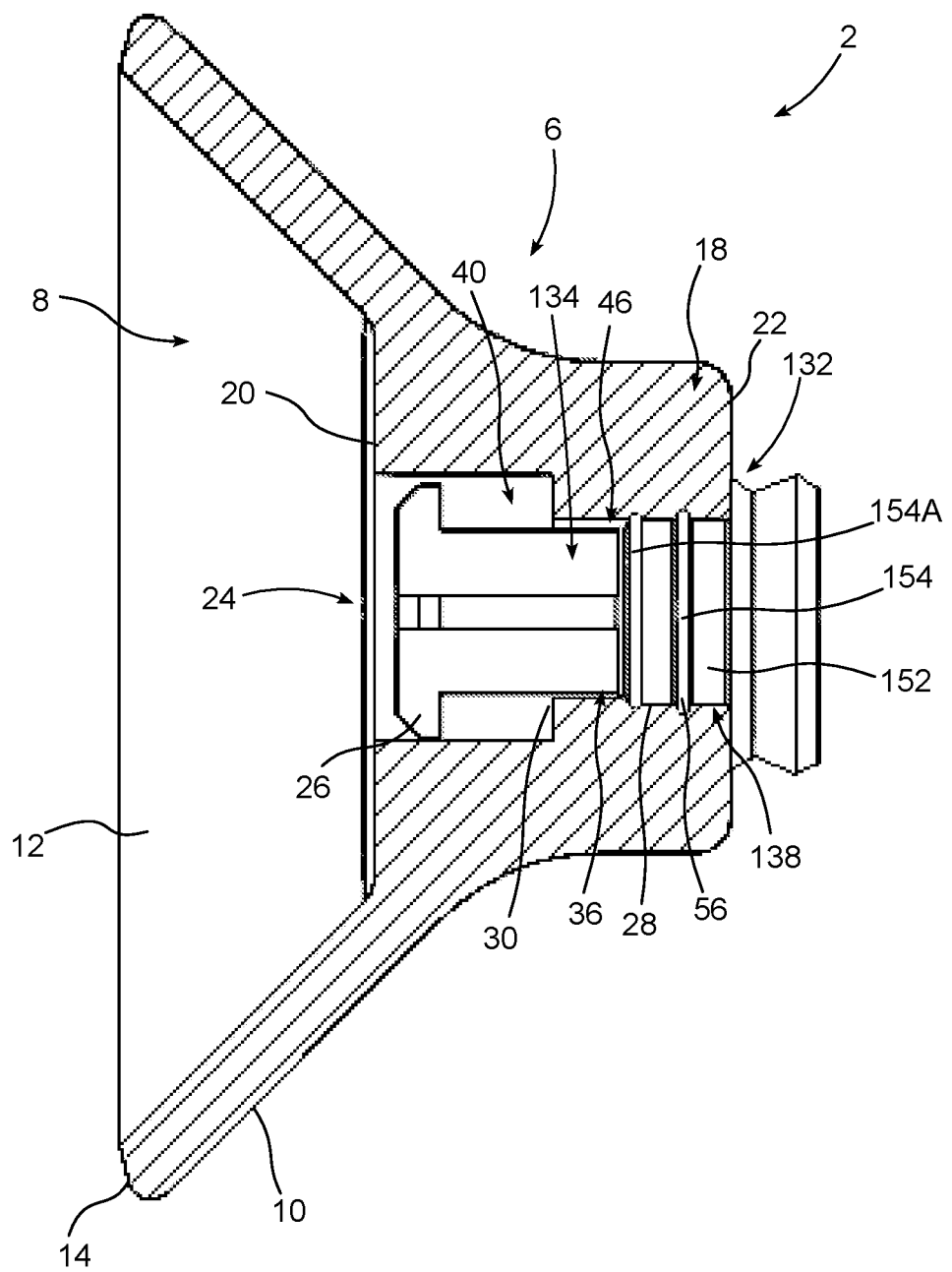
FIG. 22 is a partial cross-sectional and partial side elevation view of the suction apparatus of FIG. 20 in a closed position, with an anchor member thereof being shown cross-sectionally along its central longitudinal axis and a portion of a plunger valve thereof being shown in side elevation.
Figure 23:
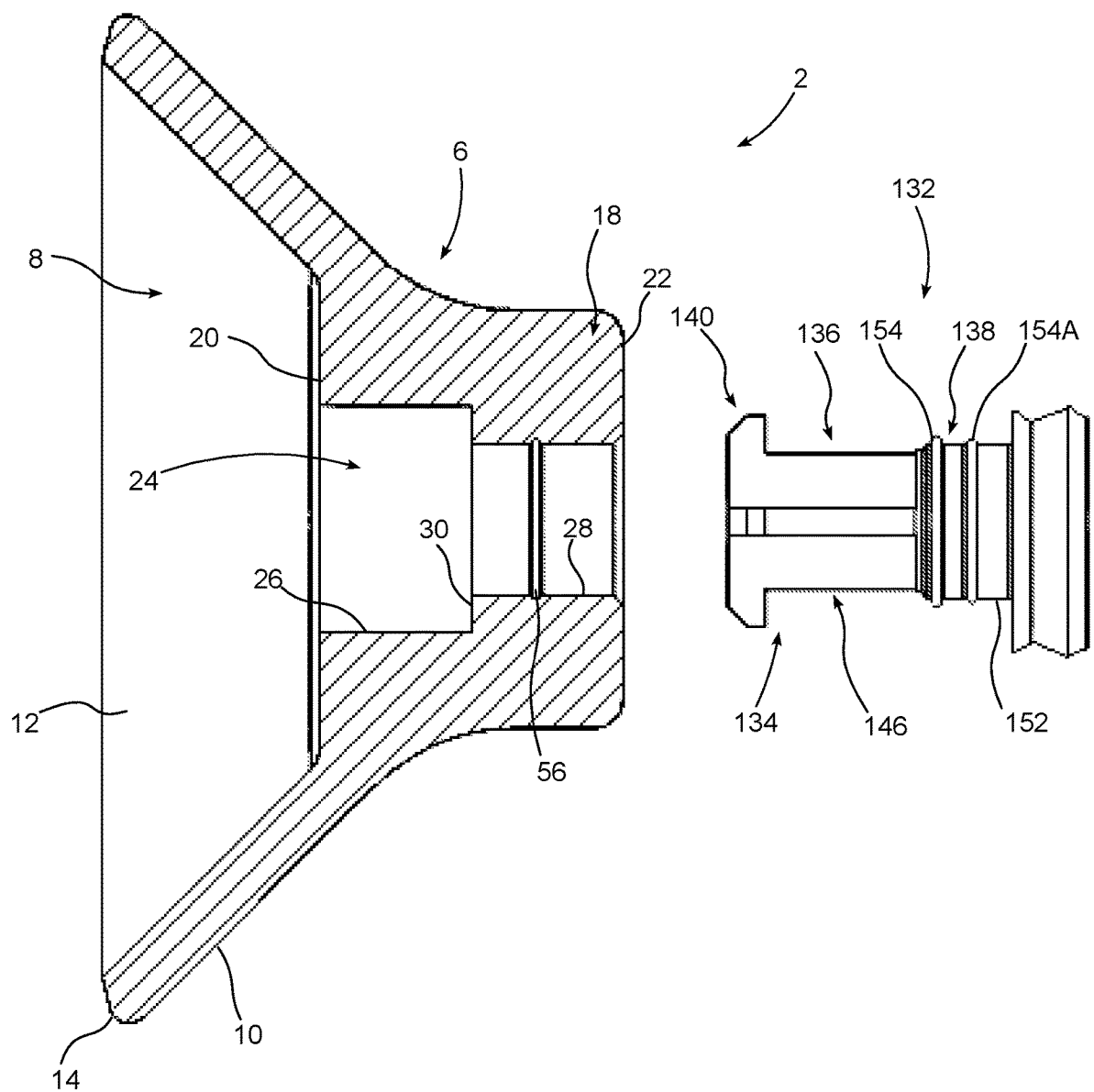
FIG. 23 is a partial cross-sectional and partial side elevation view of a suction apparatus according to another example embodiment, with an anchor member thereof being shown cross-sectionally along its central longitudinal axis and a portion of a plunger valve thereof being shown in side elevation.
Figure 24:
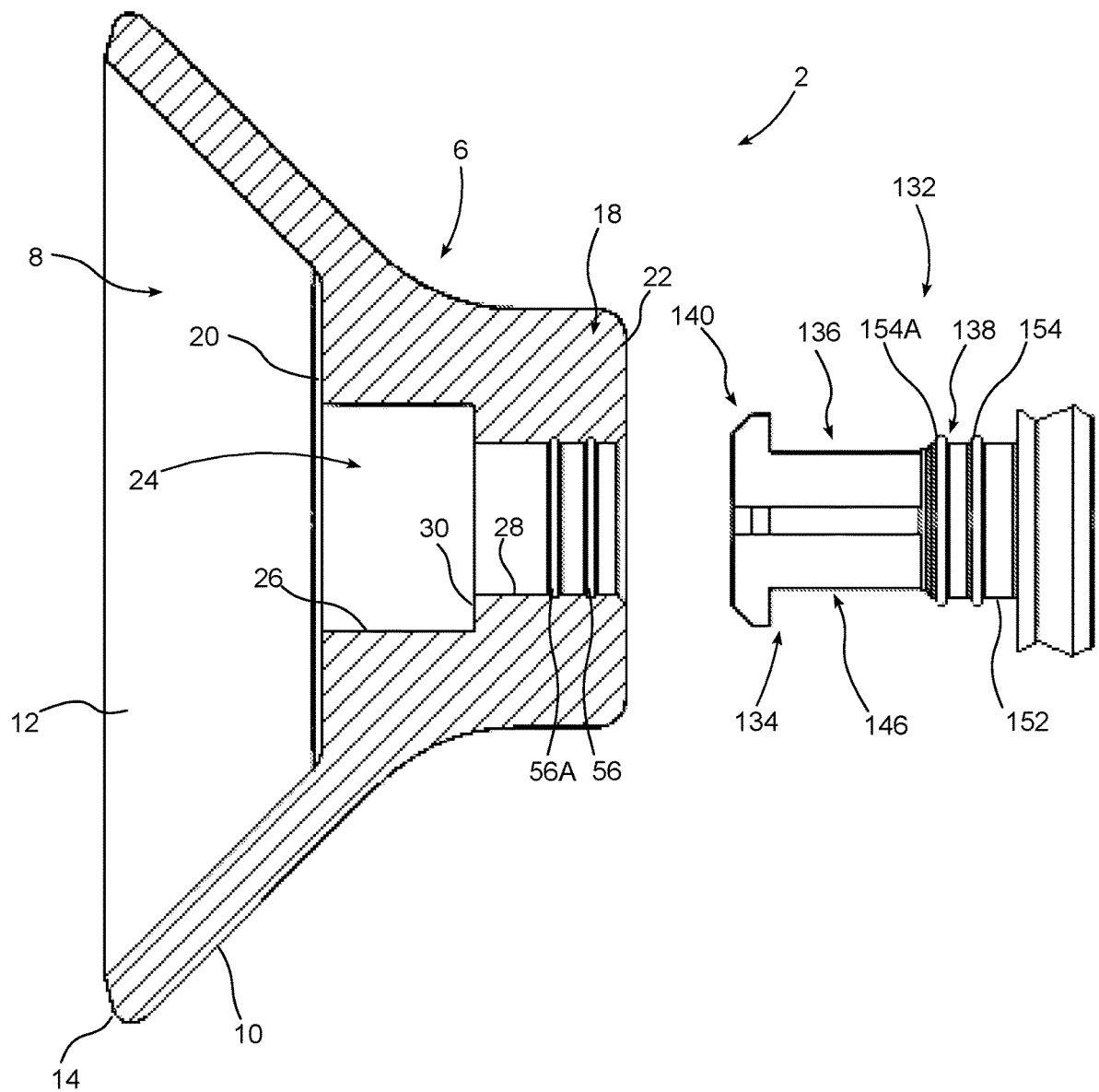
FIG. 24 is a partial cross-sectional and partial side elevation view of a suction apparatus according to another example embodiment, with an anchor member thereof being shown cross-sectionally along its central longitudinal axis and a portion of a plunger valve thereof being shown in side elevation.

The second transverse flange is provided as a transverse plug flange 154A that may be situated in spaced relation to the transverse lock flange 154 and arranged to sealably engage a separate sidewall portion of the second vent port section 28. The sidewall portion engaged by the transverse plug flange 154A may be a nominal sidewall section that is smooth and non-channeled (as shown in FIGS. 20-23) or it may be formed with a transverse-channel that receives the transverse plug flange 154A when the plunger valve 132 is in its closed position. This is shown in FIG. 24, wherein the transverse lock flange 154 and the transverse plug flange respectively engage corresponding transverse lock channels 56 and 56A.

Figure 20:
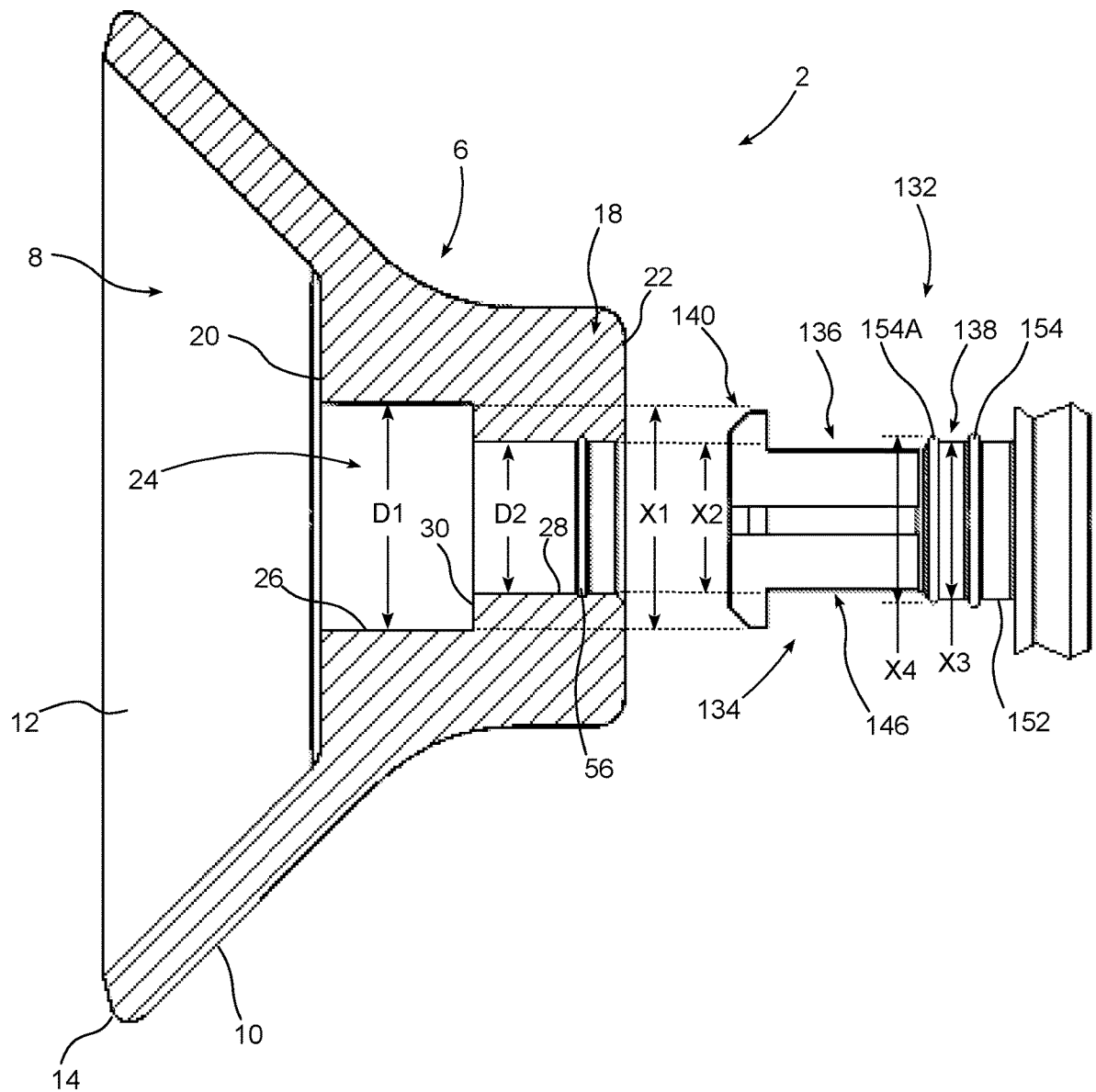
FIG. 20 is a partial cross-sectional and partial side elevation view of a suction apparatus according to another example embodiment, with an anchor member thereof being shown cross-sectionally along its central longitudinal axis and a portion of a plunger valve thereof being shown in side elevation.
Figure 21:
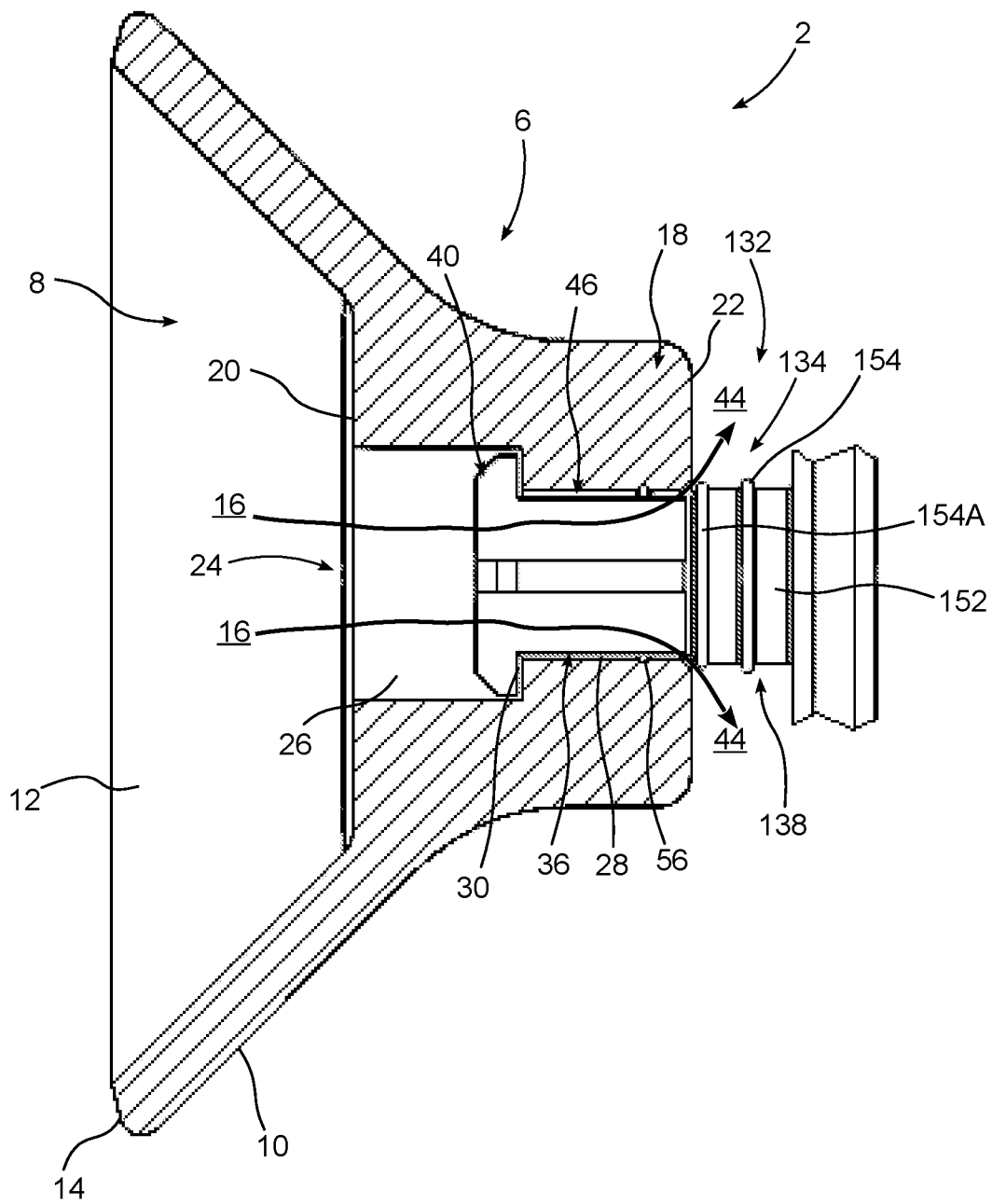
FIG. 21 is a partial cross-sectional and partial side elevation view of the suction apparatus of FIG. 20 in an open position, with an anchor member thereof being shown cross-sectionally along its central longitudinal axis and a portion of a plunger valve thereof being shown in side elevation.

The transverse plug flange 154A may be disposed on either side of the transverse lock flange 154, at any location along the length of the vent port stopper 152. In FIGS. 20-22, the transverse plug flange 154A is located on the inboard side of the transverse lock flange 154 (i.e., the side closest to the base seal member 8), and is thus comparatively closer to the base seal member than the transverse lock flange. More particularly, the transverse plug flange 154A may be located proximate to the inboard end of the vent port stopper 152. In other embodiments, the transverse plug flange 154A could be located elsewhere, such as on the outboard side of the transverse lock flange 154 (i.e., the side farthest from the base seal member 8), such that it is comparatively farther away from the base seal member than the transverse lock flange. This is shown in FIG. 23. FIG. 24 illustrates a further example embodiment in which the transverse flanges 154 and 154A both engage respective transverse lock channels 56 and 56A. In this embodiment, the transverse flanges 154 and 154A may each be considered either a transverse lock flange, a transverse plug flange, or both.

No matter where the transverse plug valve 154A is located relative to the transverse lock flange 154, the inboard-most flange should be arranged to disengage from the vent port 24 when the plunger valve 132 is in its open position. This will facilitate air flow through the vent port 24. This is shown by way of example in FIG. 21. On the other hand, when the plunger valve 132 is in its closed position, the transverse flanges 154 and 154A will block airflow through the vent port 24. This is shown in FIG. 22.

In the embodiments shown in FIGS. 1-23, the transverse plug flange 154A engages a nominal sidewall portion of the suction cup's second vent port section 28 that is non-channeled. To promote efficient vent port sealing, the modified plunger valve 132 may be designed so that the transverse plug flange 154A maintains an interference fit with the vent port sidewall. For example, as shown in FIG. 20, the transverse plug flange 154A may be formed with a transverse dimension "X4" that is slightly larger than the transverse dimension "D2" of the second vent port section 28. In the illustrated embodiments, both the transverse plug flange 154A and the second vent port section 28 have circular cross-sections. As such, the dimensions "X4" and "D2" are diameters, and the "X4" diameter of the transverse plug flange 154A is larger than the "D2" diameter of the second vent port section 28. For embodiments wherein the cross-sectional shapes of the transverse plug flange 154A and the second vent port section 28 are not symmetrical, such that the dimensions "X4" and "D2" are not uniform in all transverse directions, an interference fit may be established by making "X4" larger than "D2" in one or more transverse directions.

The portions of the plunger valve's vent port stopper 152 that do not include the transverse flanges 154 and 154A may be equal to or smaller in cross-sectional size than the second vent port section 28. Thus, transverse dimension "X3" of the vent port stopper 152 may be equal to or slightly less than the transverse dimension "D2" of the second vent port section 28. In the illustrated embodiment wherein the vent port stopper 152 and the second vent port section 28 have a each circular cross-section, the dimensions "X3" and "D2" will be diameters, and the "D2" diameter of the second vent port section 28 may be equal to or larger than the "X3" diameter of the vent port stopper 152.

In FIGS. 20-22, the transverse plug flange 154A is cross-sectionally smaller than the transverse lock flange 154. However, this need not always be the case. In alternative embodiments, the transverse plug flange 154A could be the same size or even cross-sectionally larger than the transverse lock flange 154. For example, FIG. 24 illustrates an embodiment wherein the transverse flanges 154 and 154A are the same size.

The plunger valve constructions shown in FIGS. 20-24 that utilize both first and second transverse flanges provide robust sealing while reducing the force required to pull out the plunger valve 32 to its open position. If desired, one or more additional instances of the transverse plug flange 154A and/or the transverse lock flange 154 could be provided, such that the plunger valve stem 132 has a plurality of transverse flanges, some or all of which may engage the vent port sidewall, or a transverse channel therein.

Accordingly, a valve-actuated suction apparatus has been disclosed. Although the suction apparatus has been described and shown in the context of certain example embodiments, it should be apparent that variations and alternative embodiments could be implemented in accordance with the present disclosure. The disclosed suction apparatus may be embodied in many different shapes and sizes to operate with many different types of auxiliary structures, including but not limited to bowls, buckets, cans, vases, urns, tanks, or other apparatus whose function is to hold or carry an object or material. Alternatively, the auxiliary structures may themselves represent objects or materials to be anchored instead of being holders or carriers for other objects or materials. Examples of such auxiliary structures include tools, implements, devices, equipment or other articles that could be integrated with, attached to, mounted on, or formed with the disclosed suction apparatus. Broadly speaking, the disclosed suction apparatus may be used for anything imaginable that a user might wish to anchor to a reference surface. Alternatively, it should be understood that the disclosed suction apparatus may be used for applications that do not involve auxiliary structures or the anchoring of object or materials other than the suction apparatus itself. Examples include medical applications such as therapeutic massage cupping, lifting applications such as sheet glass installation, and novelty/amusement applications.

Reference in the present disclosure to an "embodiment" means that a particular feature, structure or characteristic described in connection with the embodiment may be included in at least one embodiment of the disclosed apparatus. Thus, the appearances of the term "embodiment" in various places throughout the specification are not necessarily all referring to the same embodiment.

For purposes of explanation, specific configurations and details have been set forth herein in order to provide a thorough understanding of the present invention. However, it will be apparent to one of ordinary skill in the art that embodiments of the present invention may be practiced without the specific details presented herein. Furthermore, well-known features may have been omitted or simplified in order not to obscure the present invention. Various examples may be given throughout this description. These examples are merely descriptions of specific embodiments of the invention. The scope of the invention is not limited to the examples given.

As used in this application, the terms such as "upper," "lower," "top," "bottom," "vertical," "vertically," "lateral," "laterally," "inner," "outer," "outward," "inward," "front," "frontward," "forward," "rear," "rearward," "upwardly," "downwardly," "inside," "outside," "interior," "exterior," and other orientational descriptors are intended to facilitate the description of the example embodiments of the present disclosure, and are not intended to limit the structure of the example embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Terms of rough approximation, such as "generally," are understood by those of ordinary skill to refer to a characteristic or feature of that bears resemblance to something, such that it is reasonable to draw a comparison to facilitate understanding, without requiring that the characteristic or feature be exactly the same, or even substantially the same, as the thing to which it is compared.

It is understood, therefore, that the invention is not to be in any way limited except in accordance with the spirit of the appended claims and their equivalents.

What is claimed is:

1. A valve-actuated suction apparatus, comprising:
    an anchor member comprising a non-porous resilient material;
    the anchor member comprising a flexible base seal member and an anchor member stem;
    the base seal member being arranged to seal against a surface;
    the anchor member stem comprising a vent port extending therethrough;
    a plunger valve operable to selectively seal and unseal the vent port;
    the plunger valve comprising a plunger valve head and a plunger valve stem;
    the plunger valve stem being slidably disposed in the vent port and slidable between a closed position of the plunger valve wherein the vent port is sealed and an open position of the plunger valve wherein the vent port is unsealed;
    the plunger valve stem comprising two or more protruding transverse flanges that sealably engage a sidewall of the vent port when the plunger valve is in the closed position;
    the plunger valve stem comprising a first transverse flange that sealably engages a corresponding first transverse channel in the vent port and a second transverse flange that sealably engages either a non-channeled portion of the vent port sidewall or a corresponding second transverse channel in the vent port; and
    wherein the first transverse flange is (a) outboard of the second transverse flange so as to be comparatively farther from the base seal member, or (b) inboard of the second transverse flange so as to be comparatively closer to the base seal member.

2. The apparatus of claim 1, wherein at least one of the two or more transverse flanges sealably engages the vent port sidewall with an interference fit.

3. The apparatus of claim 1, wherein each of the two or more transverse flanges sealably engages a corresponding transverse channel in the vent port sidewall.

4. The apparatus of claim 1, wherein the second transverse flange sealably engages the vent port sidewall with an interference fit.

5. The apparatus of claim 1, wherein each of the first and second transverse flanges sealably engages the vent port sidewall with an interference fit.

6. The apparatus of claim 1, wherein portions of the plunger valve stem that do not comprise the two or more transverse flanges are equal to or smaller in cross-sectional size than the vent port.

7. The apparatus of claim 1, wherein one of the transverse flanges is cross-sectionally larger than the other.

8. The apparatus of claim 1, wherein the first transverse flange is cross-sectionally larger than the second transverse flange.

9. The apparatus of claim 1, wherein the first and second transverse flanges are the same size.

10. The apparatus of claim 1, wherein the vent port and the two or more transverse flanges have circular cross-sections, and wherein the two or more transverse flanges comprise two or more circular rings.

11. The apparatus of claim 1, wherein the two or more transverse flanges are disposed on an outboard vent port stopper portion of the plunger valve stem, and wherein the plunger valve stem further includes an inboard air bypass neck portion of the plunger valve stem.

12. The apparatus of claim 11, wherein the two or more transverse flanges sealably engage(s) the vent port in order to block airflow through the vent port when the plunger valve is in the closed position, and wherein the two or more transverse flanges disengage(s) from the vent port to allow airflow through the vent port when the plunger valve is in the open position.

13. The apparatus of claim 12, wherein the inboard air bypass neck portion is arranged to allow airflow through the vent port when the plunger valve is in the open position.

14. A method of using a valve-actuated suction apparatus:
the valve-actuated suction apparatus comprising:
an anchor member comprising a non-porous resilient material;
the anchor member comprising a flexible base seal member and an anchor member stem;
the base seal member being arranged to seal against a surface;
the anchor member stem comprising a vent port extending therethrough;
a plunger valve operable to selectively seal and unseal the vent port;
the plunger valve comprising a plunger valve head and a plunger valve stem;
the plunger valve stem being slidably disposed in the vent port and slidable between a closed position of the plunger valve wherein the vent port is sealed and an open position of the plunger valve wherein the vent port is unsealed;
the plunger valve stem comprising two or more protruding transverse flanges that sealably engage a sidewall of the vent port when the plunger valve is in the closed position;
the plunger valve stem comprising a first transverse flange that sealably engages a corresponding first transverse channel in the vent port and a second transverse flange that sealably engages either a non-channeled portion of the vent port sidewall or a corresponding second transverse channel in the vent port; and
wherein the first transverse flange is (a) outboard of the second transverse flange so as to be comparatively farther from the base seal member, or (b) inboard of the second transverse flange so as to be comparatively closer to the base seal member;
the method comprising (in no particular order):
positioning the suction apparatus so that the base seal member is in contact with the surface, with the plunger valve in either the closed position or the open position;
causing the plunger valve to assume or maintain the closed position while flattening the base seal member (as necessary) against the surface to establish an airtight seal therewith; and
actuating the plunger valve to the open position while the base seal member is attached to the surface to detach the seal member from the surface.

* * * * *